(12) United States Patent
Yatchak et al.

(10) Patent No.: US 6,588,863 B1
(45) Date of Patent: Jul. 8, 2003

(54) SNEEZE GUARDS AND METHODS FOR THEIR CONSTRUCTION AND USE

(75) Inventors: Steven Yatchak, Wakefield, MI (US); Chuck DeWitt, Conifer, CO (US)

(73) Assignee: Brass Smith, Inc., Denver, CO (US)

( * ) Notice: Subject to any disclaimer, the term of this patent is extended or adjusted under 35 U.S.C. 154(b) by 0 days.

(21) Appl. No.: 09/580,310

(22) Filed: May 26, 2000

(51) Int. Cl.[7] .............................................. A47B 96/14
(52) U.S. Cl. ..................... 312/140.4; 211/206; 211/189; 248/222.14; 108/147.11; 312/137
(58) Field of Search ................................ 211/206, 207, 211/189; 248/222.14, 122.1, 159, 125.1, 125.7; 108/147.14, 149, 6, 8, 147.11, 147.12, 147.15, 147.17, 147.21; 312/140.4, 137

(56) References Cited

U.S. PATENT DOCUMENTS

| | | | | |
|---|---|---|---|---|
| 3,500,594 A | * | 3/1970 | O'Brien | ...................... 108/8 X |
| 4,132,178 A | * | 1/1979 | Mueller et al. | ..... 108/147.14 X |
| 4,237,798 A | * | 12/1980 | Welsch et al. | ...... 108/147.14 X |
| 4,892,366 A | | 1/1990 | Yerman | |
| D309,540 S | | 7/1990 | Suttles et al. | |
| 5,002,247 A | * | 3/1991 | Dispenza et al. | ... 108/147.14 X |
| 5,111,956 A | | 5/1992 | Jow | |
| D337,462 S | | 7/1993 | LaVaute et al. | |
| 5,409,122 A | * | 4/1995 | Lazarus | ............. 108/147.14 X |
| 5,584,545 A | | 12/1996 | LaVaute et al. | |
| 5,826,850 A | * | 10/1998 | Goldsmith | .............. 108/150 X |
| 5,974,984 A | * | 11/1999 | Mitjans | .................. 108/150 X |
| 6,093,878 A | * | 7/2000 | Hoshino | .............. 248/122.1 X |
| 6,132,018 A | * | 10/2000 | McGrath | ................. 312/140.4 |

\* cited by examiner

Primary Examiner—John G. Weiss
Assistant Examiner—Michael J. Fisher
(74) Attorney, Agent, or Firm—Townsend and Townsend and Crew LLP

(57) ABSTRACT

A sneeze guard includes at least one post and a bracket assembly that is coupled to the post. The bracket assembly is configured to be moveable relative to the post and includes a locking mechanism that is operable to lock the bracket assembly to the post at a certain location on the post. Further, a panel is coupled to the bracket assembly.

24 Claims, 7 Drawing Sheets

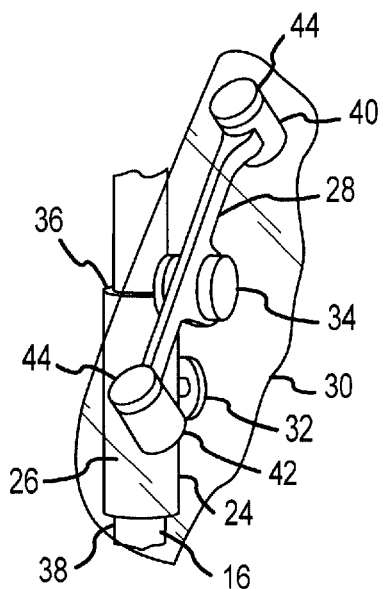
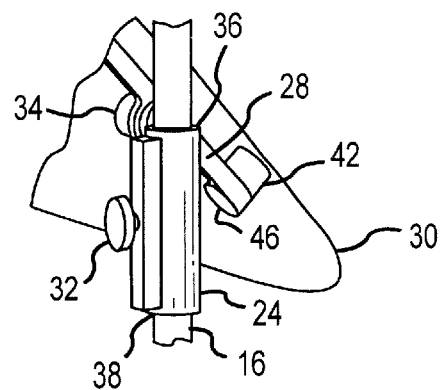
FIG.2  FIG.3
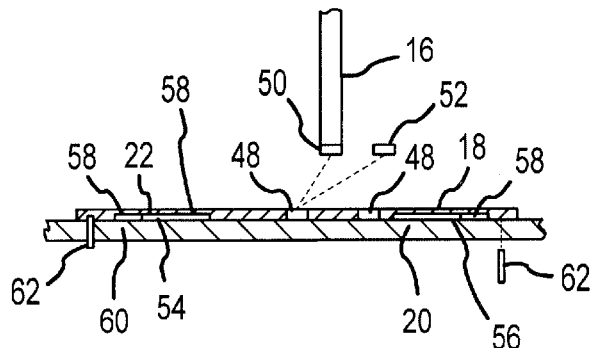
FIG.4
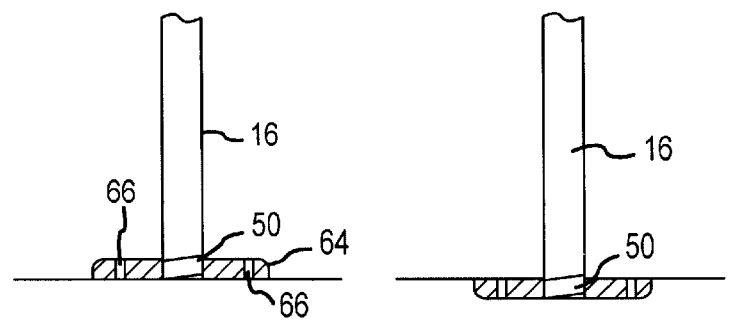
FIG.5  FIG.6

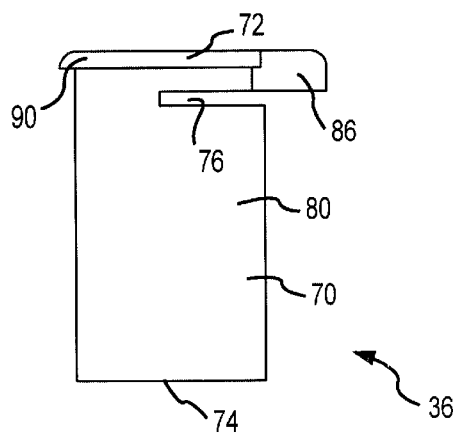
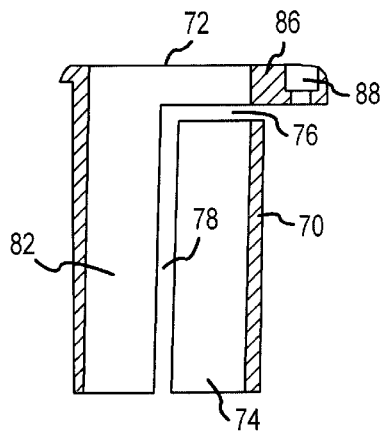
FIG.7  FIG.9
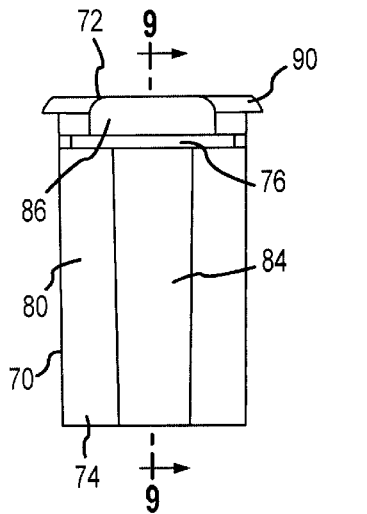
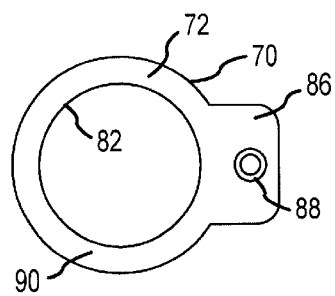
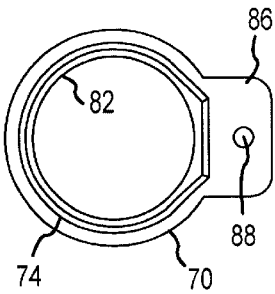
FIG.10  FIG.11
FIG.8
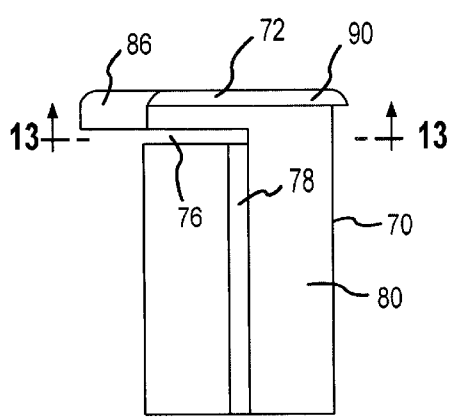
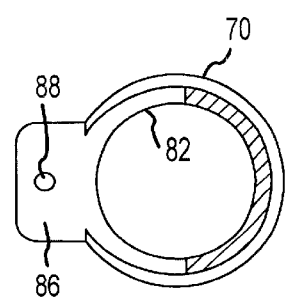
FIG.12  FIG.13

SNEEZE GUARDS AND METHODS FOR THEIR CONSTRUCTION AND USE

BACKGROUND OF THE INVENTION

The invention relates generally to the field of food protection, and in particular to the use of sneeze guards to protect displayed food. More specifically, the invention relates to sneeze guards having various adjustable features to make the sneeze guards highly versatile. Some of the features of the sneeze guards may also find use with non-food applications as well.

The display of food items is important to many industries. For example, prepared food is often displayed in grocery stores, restaurants, cafeterias, bakery shops, and the like. When openly displaying food, the chances of having the food become contaminated are increased, especially when potential customers stand over the displayed food when inspecting the food.

As a result, various health and safety codes have been implemented to regulate the display of food. Such codes have promoted the development of various sneeze guards. For example, some sneeze guards include a frame holding one or more clear panels that is placed between the customer and the food. In some case, the customer may be provided access to the food by reaching beneath the panel.

Sneeze guards may be used in a variety of settings where food is displayed. For example, sneeze guards may be used on food counters, buffets, smorgasbords, and the like. Because such a wide variety of settings exist, a versatile sneeze guard would be useful. Hence, the invention as related to sneeze guards that are adjustable and versatile to permit them to be used in a wide variety of applications, including applications outside of the food display arena.

SUMMARY OF THE INVENTION

The invention provides exemplary sneeze guards and methods for their construction and use. Advantageously, some of the features of the sneeze guards may be used for other applications. In one embodiment, a sneeze guard comprises at least one post, and a bracket assembly that is coupled to the post in a manner such that the bracket assembly may move relative to the post. Further, the bracket assembly includes a locking mechanism that may be operated to lock the bracket assembly to the post at a certain location. In this way, the bracket assembly may be moved to a desired location on the post, and the locking mechanism operated to secure the bracket assembly to the post. The sneeze guard further includes a panel that is coupled to the bracket assembly. With such configuration, the position of the panel may be adjusted by adjusting the location of the bracket assembly on the post. For example, if the post is vertically oriented, the height of the panel may be adjusted using the bracket assembly.

In one particular aspect, the bracket assembly comprises a housing that is receivable about the post, and an arm that is pivotally coupled to the housing. Further, the panel is coupled to the arm. In another aspect, the locking mechanism comprises an insert that is disposed within the housing, a locking bar that is positioned between the housing and the insert, and an actuator to force the locking bar against the insert to cause the insert to constrict about the post. By utilizing the insert, the housing may be secured to the post without marring, disfiguring, defacing, or producing marks, indentations, scratches, or the like, on the post. In this way, the post may be constructed of a wide variety of materials and still be used in combination with a locking mechanism, without the concern for scratching or marking the post.

In one particular aspect, the post comprises an elongate cylindrical body, and the housing includes a cylindrical section. With such a configuration, the insert comprises a tubular sleeve having an elongate slot. In this way, when the locking bar is forced against the sleeve, the slot begins to close to permit the sleeve to constrict about the post. In still another aspect, the actuator comprises a screw that extends through a threaded opening in the housing so as to be in contact with the locking bar. In this way, the screw may be turned to force the locking bar against the sleeve. Due to the cylindrical section of housing, the elongate slot of the sleeve begins to close as the sleeve constricts about the post.

In another particular aspect, the housing includes a plurality of teeth to mesh with a corresponding plurality of teeth on the arm. A screw is provided to pivotally couple the arm to the housing. In this way, the position of the arm relative to the housing may be adjusted by loosening the screw and turning the arm relative to the housing to the desired orientation. The screw is then tightened to secure the arm to the housing, with the meshing teeth assisting in preventing rotation of the arm relative to the housing. With such a configuration, the rotational orientation of the panel relative to the post may be easily adjusted.

In still another aspect, the arm includes a coupling mechanism to couple the panel to the arm. Conveniently coupling mechanism may include a cap that is insertable into an aperture of the arm. A screw is also provided to secure the cap to the housing. For example, the cap may be inserted into one end of the aperture while the screw is inserted through the other end of the aperture to hold the cap within the aperture. The panel is then held between the cap and the arm. Optionally, the aperture and the cap may be keyed to prevent rotation of the cap relative to the arm while the screw is being tightened. Such a configuration is advantageous in that the panel may be coupled to the arm by inserting the cap through a hole in the panel to provide a firm grip without the use of silicon or other seals. In this way, the sneeze guard may be easily assembled and disassembled down when needed, e.g. for storage, cleaning, and the like.

Conveniently, the post may include a threaded end to permit the post to be inserted into a permanent mount, such as within a countertop. Alternatively, the post may be coupled to a portable base. In one aspect, one or more stabilizers are coupled to the base. In still another aspect, the base may include a plurality of holes that are sized to receive the post. In this way, the post may be inserted into any one of the holes to adjust the depth at which the panel is positioned. Conveniently, one of more plugs may be provided and inserted into the unused holes.

In still another aspect, the sneeze guard may include a second post and a second bracket assembly that is coupled to the second post. In this way, the panel may be secured to both the first and second bracket assembly and held by the pair of posts. In one alternative configuration, two or more bracket assemblies may be coupled to the same post. In this way, two or more panels may be coupled to a single post to permit the sneeze guard to be arranged in a variety of configurations. For example, multiple panels may be arranged vertically and in the same plane to form a wall of panels. As another alternative, the panels may be oriented horizontally and in separate planes to form a series of shelves. In still another configuration, one panel may be vertically oriented while the other panel is horizontally oriented to form a panel and shelf arrangement. In another configuration, the post may be mounted to a variety of surfaces, including horizontal counters, vertical walls, ceilings, and the like.

The invention further provides an exemplary method for protecting displayed food items. The method may conveniently utilize a sneeze guard that is constructed using any of the features previously described. To protect the food, the sneeze guard is positioned such that the panel is placed between the displayed food and a viewing location where individuals may inspect the food. To properly orient the panel, the locking mechanism is unlocked and the bracket assembly is moved along the post to adjust the height of the panel relative to the food (assuming that the post is vertically positioned). Once the proper height is achieved, the actuator may be operated to constrict the insert about the post in a non-marking manner. The arm may also be rotated relative to the housing to adjust the angle of the panel relative to the post. This may be accomplished, for example, by loosening the screw, disengaging the teeth of the arm in the housing and rotating the arm to the desired position. The screw is then tightened, with the teeth interlocking to prevent rotation of the arm relative to the panel. If the panel is to be removed and/or replaced, the screw on the arm may simply be unscrewed and the cap removed to permit the panel to be removed from the arm.

BRIEF DESCRIPTION OF THE DRAWINGS

FIG. 2 is a more detailed view of a bracket assembly of the sneeze guard of FIG. 1.

FIG. 3 is a rear prospective view of the bracket assembly of FIG. 2.

FIG. 4 is an exploded view of a base of the sneeze guard of FIG. 1 illustrating one way to couple the base to a mounting surface according to the invention.

FIG. 5 illustrates an alternative base to which a post of the sneeze guard of FIG. 1 may be coupled.

FIG. 6 illustrates another alternative base to which a post of the sneeze guard of FIG. 1 may be coupled.

FIG. 7 is a right side view of an insert of the bracket assembly of FIG. 2.

FIG. 8 is a front view of the insert of FIG. 7.

FIG. 9 is a cross sectional side view of the insert of FIG. 8 taken along lines 9—9.

FIG. 10 is a top view of the insert of FIG. 7.

FIG. 11 is a bottom view of the insert of FIG. 7.

FIG. 12 is a left side view of the insert of FIG. 7.

FIG. 13 is a cross sectional top view of the insert of FIG. 12 taken along lines 13—13.

DESCRIPTION OF THE SPECIFIC EMBODIMENTS

The invention provides a variety of sneeze guards having various features that permit the sneeze guards to be used in a wide variety of settings. For example, the sneeze guards of the invention may be provided with various adjustable features to permit a single sneeze guard to be used in a variety of circumstances. Such adjustable features may include the ability to adjust the height, orientation, and/or depth of one or more sneeze guard panels. Another feature of the sneeze guards is that they may be configured to be either portable or secured to a certain location. Further, the sneeze guards are simple in design, thereby making it easy to relocate or to securely couple the sneeze guards to a surface. The simple design also lends itself to easy assembly and disassembly and facilitates cleaning of the sneeze guard.

Another feature of the sneeze guards is that they may be constructed to be easily integrated with other components. For example, a sneeze guard may be modified to include one or more additional sneeze guard panels. The sneeze guards may also be linked together to form multiple sneeze guards. A variety of bases may be provided to facilitate positioning of the sneeze guard panels at certain desired locations. The bases may also be employed to facilitate attachment of the sneeze guards to various mounting surfaces, such as counters, walls, ceilings, and the like. One particular advantage of utilizing multiple sneeze guard panels that are each adjustable is that a variety of configurations may be produced using the sneeze guard panels. For example, the sneeze guards may be provided with multiple walls, shelves, or combinations of walls and shelves by simply rearranging the various sneeze guard panels.

Various features of the sneeze guards may find use with other applications as well. For example, the sneeze guards may include a non-marking mounting device to permit a housing to be locked to a post without marking the post. Such a mounting system may find particular use in a wide variety of mounting applications where a mark, scratch, dent, or the like, on the mounting surface would be undesirable. For example, many mounting surfaces are constructed of materials that may easily scratch or dent with traditional mounting techniques. The mounting devices of the invention may be used with such surfaces without marking or otherwise disfiguring the mounting surface.

Another versatile feature of the sneeze guards is the ability to couple a panel to the arm. By utilizing a cap that is secured to a housing, the panel may be sandwiched between the cap and the housing to securely hold the panel. In this way, the panel is not required to be inserted within a frame, thereby necessitating the use a seal. Further, such a coupling technique permits the panel to be constructed of a wide variety of materials, including plastics, glass, and the like.

Figure 1:
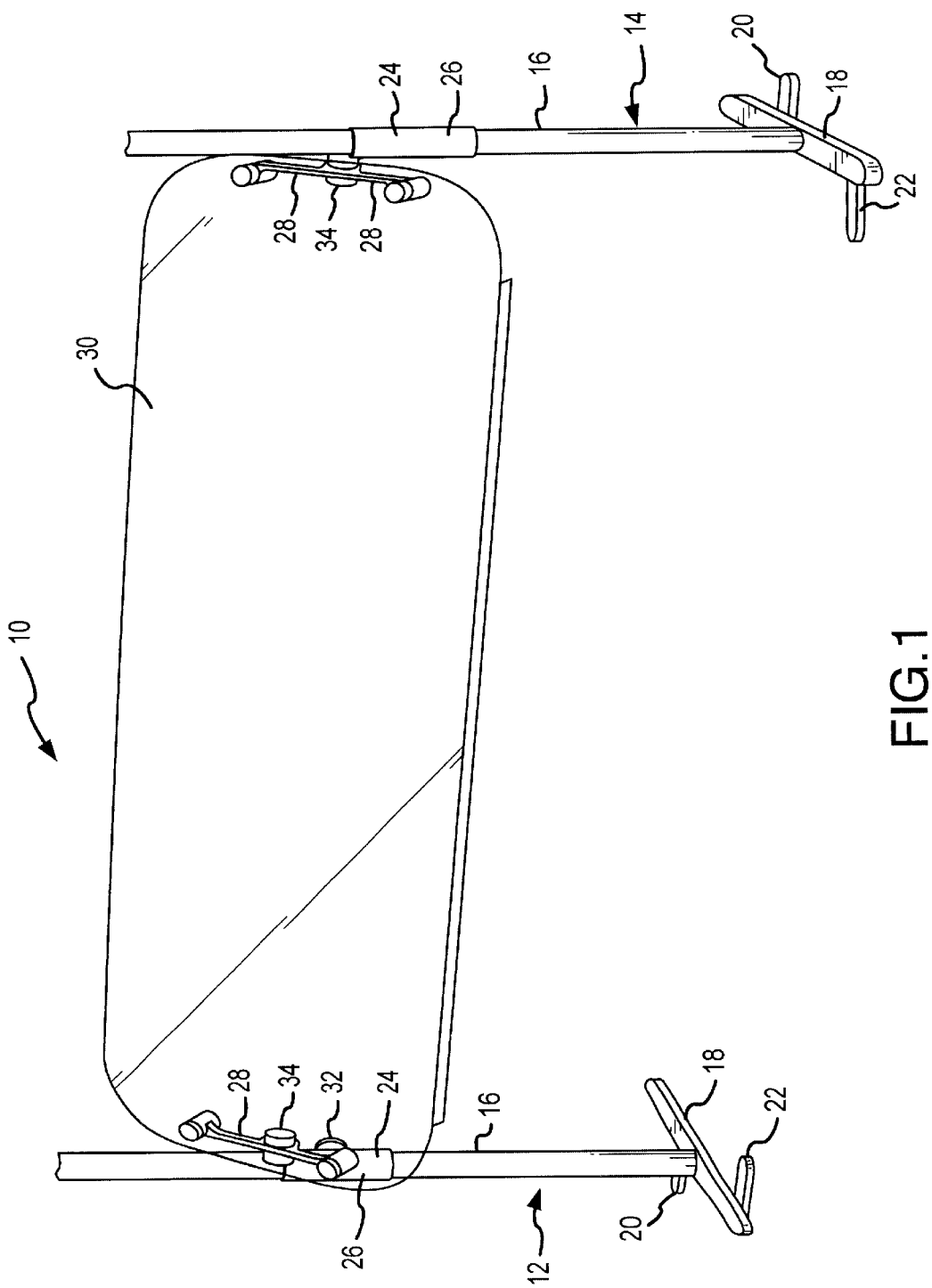
FIG. 1 is a front prospective view of one embodiment of a sneeze guard according to the invention.

Referring now to FIG. 1, one embodiment of a sneeze guard 10 will be described. Sneeze guard 10 comprises of a pair of stands 12 and 14. Stands 12 and 14 may be constructed of identical components, with each comprising a post 16 that is coupled to a base 18. Extending from bases 18 are extensions 20 and 22 that may be adjusted to enhance the stability of bases 18. Although shown with bases 18, it will be appreciated that a variety of other bases may be employed to support posts 16 depending on the particular application. Indeed, in some cases post 16 may be directly coupled to a mounting surface so that bases 18 are not needed.

Disposed about each post 16 is a bracket assembly 24. Each bracket assembly 24 comprises a housing 26 that is received about post 16, and an arm 28 that is pivotally coupled to housing 26. Coupled to arms 28 is a sneeze guard panel 30.

Bracket assembly 24 is configured so that it may be moved and secured anywhere along post 16. In this way, the vertical position of panel 30 may be adjusted simply by relocating bracket assemblies 24 along post 16. Conveniently, each bracket assembly includes a screw 32 that may be rotated to securely couple housing 26 to post 16 when at the desired location.

Bracket assembly 24 also allows the angular orientation of sneeze guard panel 30 to be adjusted by pivoting arms 28 relative to housing 26. Conveniently, a second screw 34 may be used to secure the position of arms 28 relative to housings 26 once the desired orientation of sneeze guard panel 30 has been obtained. As described hereinafter, the location of post 16 relative to bases 18 may also be adjusted to vary the depth of sneeze guard panel 30. Hence, sneeze guard 10 is constructed so that sneeze guard panel 30 may be moved vertically, horizontally, and rotationally to permit panel 30 to be positioned at a wide variety of locations.

Although sneeze guard panel 30 is shown to be generally rectangular in geometry, it will be appreciated that essentially any shape or size of sneeze guard panel may be employed. Further, sneeze guard panels may be constructed of a wide variety of materials including plastics, glass, and the like.

Referring now to FIGS. 2 and 3, construction of bracket assemblies 24 will be described in greater detail. Held within housing 26 are a pair of inserts 36 and 38 (it being appreciated that more or fewer than this number of inserts may be employed). When screw 32 is loosened, inserts 36 and 38 release their grasp on post 16. Conversely, when screw 32 is tightened, inserts 36 and 38 constrict about post 16 to lock the position of bracket assembly 24 relative to post 16. By utilizing inserts 36 and 38, bracket assembly 24 is secured to post 16 in a non-marking manner. In this way, a variety of materials may be employed to construct post 16 without being marked when bracket assembly 24 is secured to post. For example, esthetically pleasing materials that may be used include brass, stainless steel, aluminum, acrylic, and the like. Post 16 may also be constructed of a base material over which a deposited material is provided, such as brass, chrome, and the like. Post 16 may also be painted with a variety of paint types.

As previously described, panel 30 is rotated relative to post 16 by loosening screw 34 and rotating arm 28. As described in greater detail hereinafter, arm 28 and housing 26 may be provided with a plurality of interlocking teeth to help secure the location of arm 28 relative to housing 26 after screw 34 has been tightened.

Arm 28 has a pair of ends 40 and 42 that are employed to couple panel 30 to arm 28. A cap 44 is insertable into each of ends 40 and 42, and a screw 46 (see FIG. 3) is employed to hold cap 44 within ends 40 and 42. In this way, panel 30 may be coupled to arm 28 by providing appropriate holes within panel 30 and inserting caps 44 through the holes and into ends 40 and 42. Screws 46 are then tightened to pull caps 44 against panel 30 to sandwich panel 30 between caps 44 and ends 40 and 42. In this way, panel 30 may be coupled to stands 20 without requiring the use of an extensive frame that is positioned around panel 30. Further, various seals and other equipment that are typically employed to couple a panel to a frame are not needed, therefore by simplifying the design and facilitating assembly and disassembly.

Referring now to FIG. 4, coupling of post 16 to base 18 will be described in greater detail. Base 18 includes a pair of threaded holes 48 and post 16 includes a threaded end 50. In this way, post 16 may be secured to base 18 by simply screwing post 16 into one of holes 48. Conveniently, a plug 52 may be screwed into the empty hole so hat the hole will not serve as a trap for food or other particulate. Although shown with only two holes, it will be appreciated that the number of holes may be varied depending on the desired location of post 16 on base 18. .

The underside of base 18 includes a plurality of slots 54 and 56 to permit the location of extensions 22 and 20, respectively, to be varied. Optionally, extensions 20 and 22 may be provided with detents to fit within grooves 58 of base 18 to properly orient extensions 20 and 22 within slots 56 and 54. Conveniently, base 18 may be coupled to a mounting surface 60 by the use of pegs 62 that are inserted into mounting surface 60 and extend into base 18 as shown. In this way, the position of base 18 relative to a mounting surface 60 may be fixed.

As shown in FIG. 5, end 50 of post 16 may be screwed into an alternative base 64. In turn, base 64 is securely mounted to a surface by screwing screws (not shown) into through holes 66. As shown in FIG. 6, an alternative base 68 may be configured so as to be flush with a mounting surface. Post 16 may then be screwed into base 68.

Further, it will be appreciated that a variety of bases may be employed to hold post 16. Such bases may be configured to be portable or be secured to a mounting surface. Hence, the particular configuration of the base may depend on the given application.

Referring now to FIGS. 7–13, construction of insert 36 will be described in greater detail, it being appreciated that insert 38 is essentially identical to insert 36 and is simply inserted into an opposite end of housing 26. Insert 36 comprises a sleeve 70 having a top end to 72 and a bottom end 74. Formed in sleeve 70 is a horizontal slot 76 and a vertical slot 78. Sleeve 70 is constructed of a somewhat resilient material to permit vertical slot 78 to be closed when a force is provided to an outer surface 80 of sleeve 70. In this way, sleeve 70 may be constricted so that an inner surface 82 of sleeve 70 will be adjacent to the post to secure the bracket assembly to the post as previously described. Conveniently, inner surface 82 may be provided with a smooth morphology so that inner surface 82 will not scratch or mark the post when constricted about the post. Materials that may be used to construct insert 38 include plastics, rubbers, and the like.

As shown in FIG. 8, outer surface 80 may include a flat section 84 to permit a locking bar to be forced against flat section 84 to close slot 78, thereby constricting sleeve 70 about the post. Sleeve 70 further includes a tab 86 that has a hole 88. As described hereinafter, tab 86 is configured to sit within housing 26 and prevent rotation of the sleeve relative to housing 26. Hole 88 is conveniently employed to receive a screw to couple sleeve 70 to housing 26. Top end 72 may also include a rim 90 to permit sleeve 70 to rest on housing 26.

Figures 14, 15:
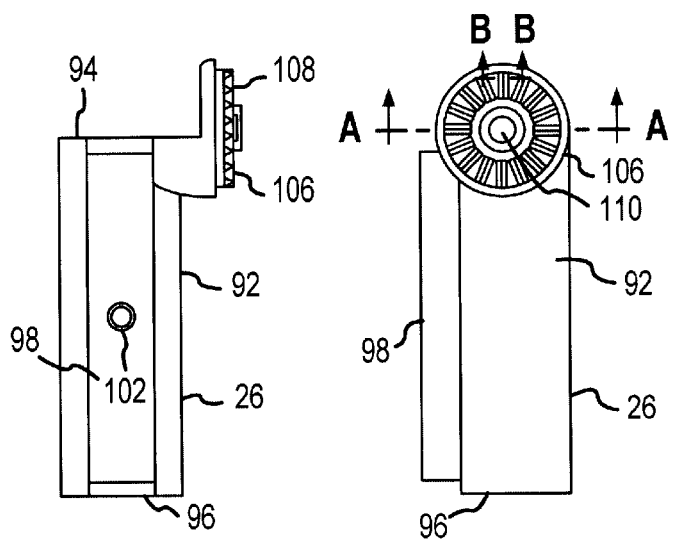
FIG. 14 is a side view of a housing of the bracket assembly of FIG. 2.
FIG. 15 is a front view of the housing of FIG. 14.
Figure 17:
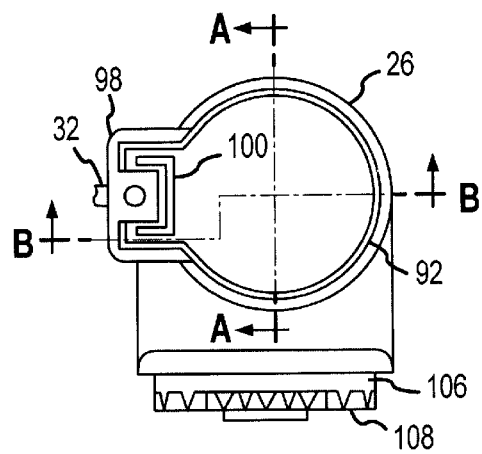
FIG. 17 is a top view of the housing of FIG. 14 and also showing a locking bar disposed within the housing.
Figures 17A, 17B:
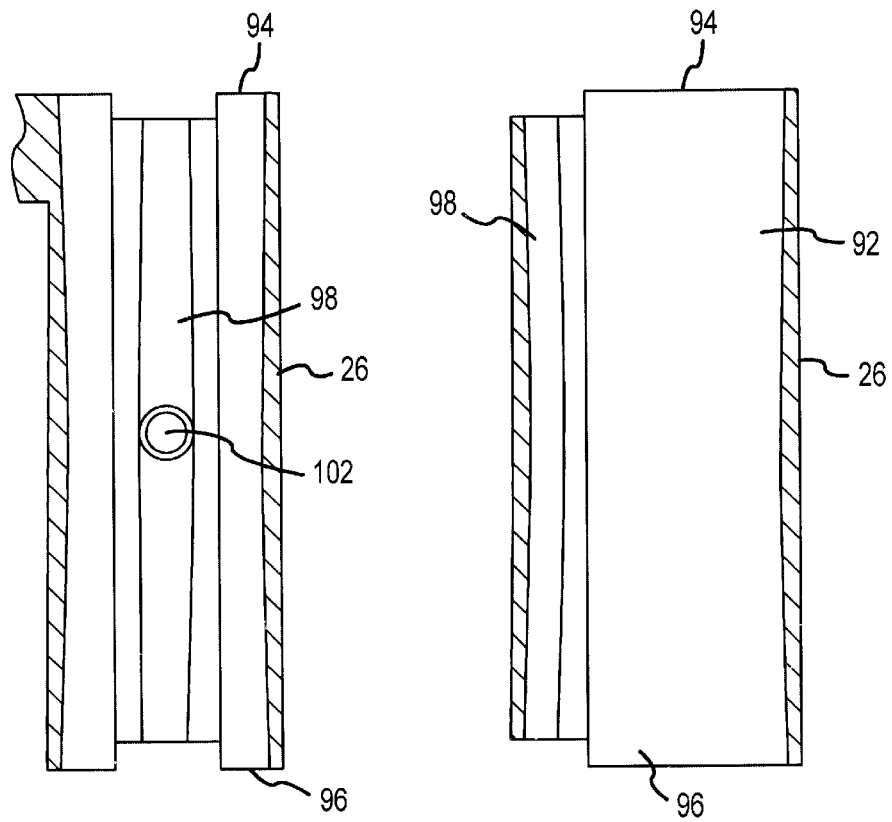
FIG. 17A is a cross sectional side view of the housing of FIG. 17 taken along lines A—A.
FIG. 17B is a cross section side view of the housing of FIG. 17 taken along lines B—B.
Figure 18:
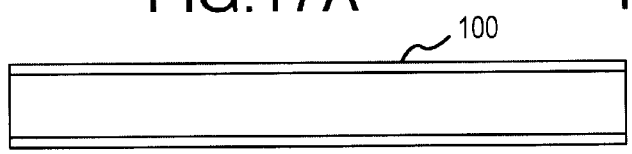
FIG. 18 is a side view of the locking bar of FIG. 17.
Figure 19:
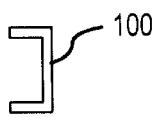
FIG. 19 is an end view of the locking bar of FIG. 17.

Referring now to FIGS. 14 and 15, construction of housing 26 will be described in greater detail. Housing 26 includes a cylindrical section 92 having a top end 94 and a bottom end 96. As previously described in connection with FIG. 2, insert 36 is insertable into top end 94 and insert 38 is insertable into bottom end 96. As shown in FIG. 17, housing 26 further includes a locking bar section 98 for receiving a locking bar 100 (see FIGS. 18 and 19). When inserts 36 and 38 are placed within housing 26, flat sections 84 (see FIG. 8) are aligned with locking bar sections 98. To permit locking bar 100 to be forced against flat sections 84, a threaded hole 102 is formed in locking bar section 98 as best shown in FIG. 14. In this way, screw 32 (see FIGS. 2 and 3) may be screwed into hole 102 to contact locking bar 100 as shown in FIG. 17. In this way, when screw 32 is tightened, locking bar 100 is moved toward the center of cylindrical section 92. In so doing, locking bar 100 is forced against flat sections 84 of inserts 36 and 38. Hence, as screw 32 is rotated, vertical slots 78 (see FIGS. 9 and 12) are closed as inserts 36 and 38 are constricted about the post. Conversely, when screw 32 is loosened, the grip applied by inserts 36 and 38 is loosened to permit housing 26 to slide over the post. As best shown in FIG. 17, locking bar section 98 includes a threaded opening 104 to permit a screw to be inserted through hole 88 of sleeve 70 (see FIG. 9) to securely couple sleeve 70 to housing 26.

Figures 15A, 15B:
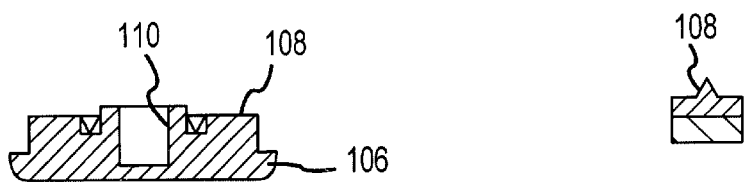
FIG. 15A is a cross sectional view of the housing of FIG. 15 taken along lines A—A.
FIG. 15B is a cross sectional view of a tooth of the housing of FIG. 15 taken along lines B—B.
Figure 16:
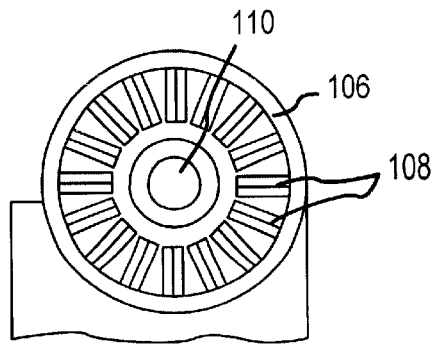
FIG. 16 is a detailed view of a plurality of teeth on the housing of FIG. 15.

As also shown in FIGS. 15A, 15B and 16, housing 26 includes a circular section 106 having a plurality of teeth 108. Circular section 106 further includes a threaded hole 110 that is adapted to receive screw 34 (see FIGS. 2 and 3). In this way, screw 32 may be employed to couple arm 28 to housing 26.

Figure 21:
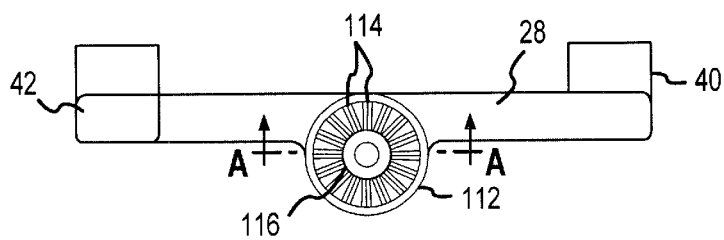
FIG. 21 is a side view of the arm of FIG. 20.
Figure 22:
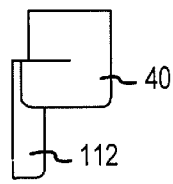
FIG. 22 is an end view of the arm of FIG. 20.
Figure 21A:
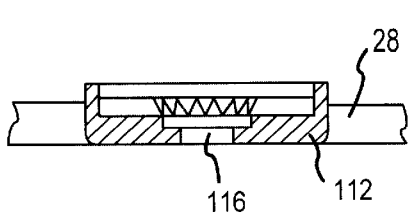
FIG. 21A is a cross sectional view of the arm of FIG. 21 taken along lines A—A.
Figure 23:
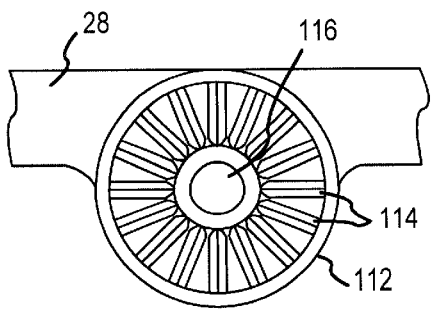
FIG. 23 is a detailed view of a plurality of teeth of the arm of FIG. 21.

As best shown in FIGS. 21, 21A and 23, arm 28 also includes a circular section 112 having a plurality of teeth 114. Circular section 112 further includes a through hole 116 through which screw 32 may be inserted. Hence, arm 28 may be coupled to housing 26 simply by inserting screw 32 through hole 116 of arm 28 and into threaded hole 110 of circular section 106 of housing 26. Arm 28 may be rotated relative to housing 26 until teeth 114 of arm 28 mesh with teeth 108 of housing 26. Screw 32 may then be tightened to secure the coupling. Such a configuration is particularly advantageous in that arm 28 may be rotated 360° about through hole 116 to permit sneeze guard panel 30 to be positioned at a wide variety of orientations relative to post 16. As the teeth mesh with each other, arm 28 is locked to housing 26 to prevent rotation between the two parts.

Figure 20:
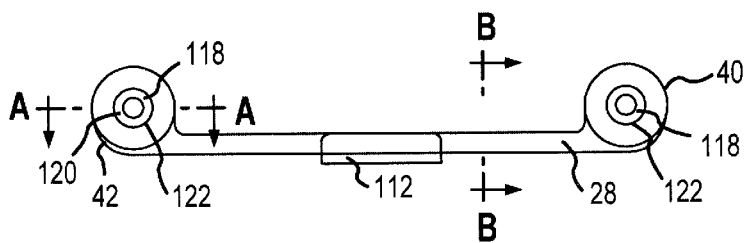
FIG. 20 is a top view of an arm of the bracket assembly of FIG. 2.
Figure 20A:
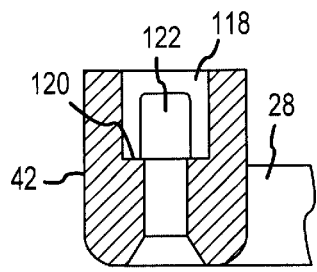
FIG. 20A is a cross sectional side view of the arm of FIG. 20 taken along lines A—A.
Figure 20B:
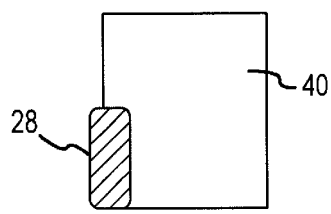
FIG. 20B is a cross sectional view of the arm of FIG. 20 taken along lines B—B.

As best shown in FIGS. 20 and 20A, ends 40 and 42 each include an opening 118 into which cap 44 (see FIG. 2) is received. Opening 118 includes a ledge 120 upon which the bottom of cap 44 may rest. Opening 118 further includes a flat section 122 that is configured to mate with a corresponding flat section on cap 44. In this way, cap 44 may be keyed relative to opening 118 to prevent relative rotation between cap 44 and end 42. Hence, when a screw (not shown) is inserted into the bottom of end 42 and into cap 44, the screw may be tightened without cap 44 rotating relative to end 42. As the screw is further tightened, cap 44 is pulled against panel 30 (see FIG. 1) to secure panel 30 to arm 28.

Figure 24:
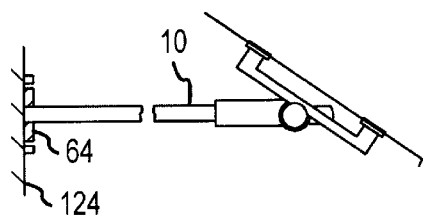
FIG. 24 is a side view of the sneeze guard of FIG. 1 when mounted to a wall according to the invention.
Figure 25:
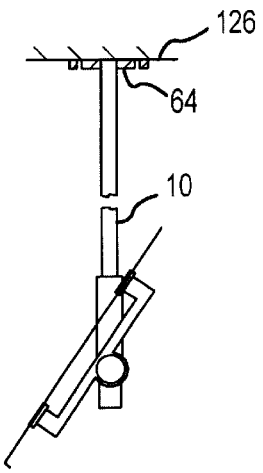
FIG. 25 illustrates the sneeze guard of FIG. 1 when mounted to a ceiling according to the invention.

As previously described, sneeze guard 10 may be used in a variety of settings. For example, as shown in FIG. 24, sneeze guard 10 is coupled to base 64 (see FIG. 5) which in turn is mounted to a wall 124. Alternatively, as shown in FIG. 25, sneeze guard 10 may be coupled to a ceiling 126.

Figure 26:
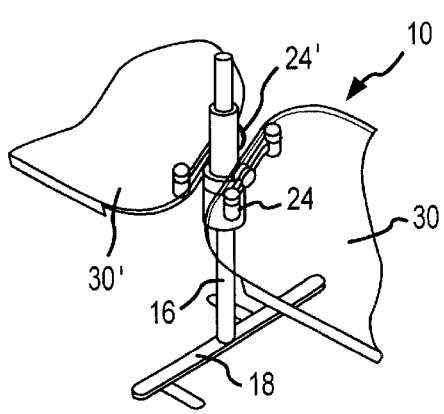
FIG. 26 illustrates an alternative embodiment of a sneeze guard having a post to which a pair of panels are coupled.

As best shown in FIG. 26, sneeze guard 10 may be modified to include a second bracket assembly 24'. In this way, a second sneeze guard panel 30' may be coupled to post 16. This scheme may be repeated to permit any number of sneeze guard panels to be aligned in a row.

Figure 27:
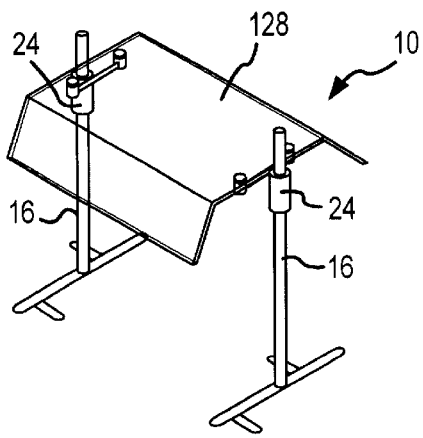
FIG. 27 illustrate still another alternative embodiment of a sneeze guard according to the invention.

Sneeze guard 10 may be provided with alternative panels. For example, as shown in FIG. 27, sneeze guard 10 may be modified to include a double sided panel 128.

Figure 28:
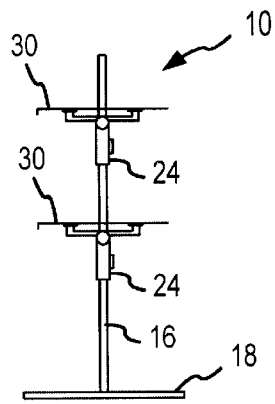
FIG. 28 is a side view of yet another embodiment of a sneeze guard having a pair of panels that are arranged as shelves according to the invention.
Figure 29:
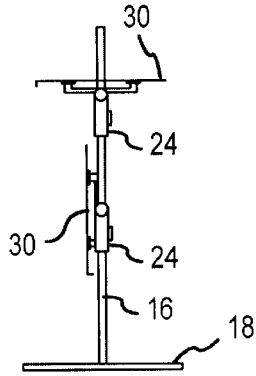
FIG. 29 illustrates the sneeze guard of FIG. 28 with one of the panels being horizontally oriented and the panel being vertically oriented.
Figure 30:
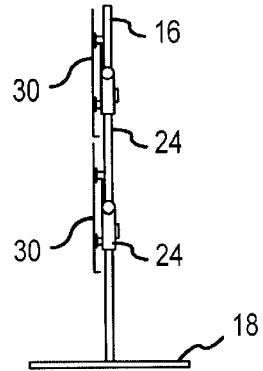
FIG. 30 illustrates the sneeze guard of FIG. 29 with both of the panels being vertically oriented.

As shown in FIGS. 28–30, sneeze guard 10 may include multiple bracket assemblies 24 on the same post, with each sneeze guard panel 30 being located on the same side of the post. In FIG. 28, sneeze guard panels 30 are positioned horizontally and spaced apart from each other to form a pair of shelves. In FIG. 29, one of the sneeze guard panels is vertically oriented while the other is horizontally oriented to form a shelf and wall arrangement. In FIG. 30, both sneeze guard panels 30 are vertically oriented to create a wall. Further, it will be appreciated that additional bracket assemblies and sneeze guard panels may be coupled to a single post and located either on the same or opposite sides of the posts. Still further, the sneeze guard panels may be positioned at essentially any angular orientation to create a wide variety of configurations.

The invention has now been described in detail for purposes of clarity of understanding. However, it would be appreciated that certain changes and modifications may be practiced within the scope of the appended claims.

What is claimed is:

1. A sneeze guard comprising:
    at least one post having a longitudinal axis defining a length;
    a bracket assembly coupled to the post such that the bracket assembly is movable lengthwise relative to the longitudinal axis of the post;
    an arm pivotally coupled to and extending from the bracket assembly;
    a locking mechanism that is operable to lock the bracket assembly to the post at a certain location relative to the post; and
    a panel coupled to the bracket assembly by the arm, wherein the panel is movable to different angular locations relative to the post by pivoting the arm.

2. A sneeze guard as in claim 1, wherein the bracket assembly further comprises a housing that is receivable about the post and wherein the arm is pivotally coupled to the housing.

3. A sneeze guard as in claim 2, wherein the locking mechanism comprises an insert that is disposed within the housing, a locking bar positioned between the housing and the insert, and an actuator to force the locking bar against the insert to cause the insert to constrict about the post.

4. A sneeze guard as in claim 3, wherein the actuator comprises a screw extending through a threaded opening in the housing so as to be in contact with the locking bar.

5. A sneeze guard as in claim 3, wherein the post comprises an elongate cylindrical body, wherein the housing includes a cylindrical section, and wherein the insert comprises a tubular sleeve having an elongate slot such that when the locking bar is forced against the sleeve, the slot begins to close to permit the sleeve to constrict about the post.

6. A sneeze guard as in claim 2, wherein the housing includes a plurality of teeth, wherein the arm includes a plurality of teeth to interlock with the housing teeth, and further comprising a screw to pivotally couple the arm to the housing.

7. A sneeze guard as in claim 2, wherein the arm includes a coupling mechanism which couples the panel to the arm.

8. A sneeze guard as in claim 7, wherein the arm defines an aperture, and wherein the coupling mechanism comprises a cap insertable into the aperture and a screw to secure the cap to the housing, and wherein the panel is held between the cap and the arm.

9. A sneeze guard as in claim 8, wherein the arm defining the aperture and the cap are keyed to prevent rotation of the cap relative to the arm.

10. A sneeze guard as in claim 1, further comprising a base, and wherein the post is coupled to the base.

11. A sneeze guard as in claim 10, further comprising at least one stabilizer coupled to the base.

12. A sneeze guard as in claim 10, wherein the base includes a plurality of holes sized to receive the post, and wherein the post is inserted into one of the holes, and further comprising a plug that is inserted into another one of the holes.

13. A sneeze guard as in claim 1, further comprising a second post and a second bracket assembly coupled to the second post, and wherein the second bracket assembly is also coupled to the panel.

14. A sneeze guard as in claim 1, further comprising a second bracket assembly coupled to the post and a second panel coupled to the second bracket assembly.

15. A sneeze guard as in claim 1, wherein the bracket assembly includes a pair of arms, and further comprising a panel coupled to each arm.

16. A sneeze guard as in claim 1, wherein the panel is constructed of a clear material.

17. A sneeze guard comprising:
   at least one post;
   a bracket assembly coupled to the post such that the bracket assembly is movable relative to the post, wherein the bracket assembly includes a locking mechanism that is operable to lock the bracket assembly to the post at a certain location on the post; and
   a panel coupled to the bracket assembly;
   wherein the bracket assembly further comprises a housing that is receivable about the post and an arm pivotally coupled to the housing, wherein the panel is coupled to the arm, wherein the arm defines an aperture, and wherein the coupling mechanism comprises a cap insertable into the aperture and a screw to secure the cap to the housing, and wherein the panel is held between the cap and the arm, and wherein the arm defining the aperture and the cap are keyed to prevent rotation of the cap relative to the arm.

18. A sneeze guard comprising:
   at least one post;
   a bracket assembly coupled to the post such that the bracket assembly is movable relative to the post, wherein the bracket assembly includes a locking mechanism that is operable to lock the bracket assembly to the post at a certain location on the post;
   a panel pivotally coupled to the bracket assembly; and
   a second post and a second bracket assembly coupled to the second post, and wherein the second bracket assembly is also pivotally coupled to the panel to permit the panel to be pivoted relative to the posts.

19. A sneeze guard comprising:
   at least one post;
   a bracket assembly coupled to the post such that the bracket assembly is movable relative to the post, wherein the bracket assembly includes a locking mechanism that is operable to lock the bracket assembly to the post at a certain location on the post;
   a panel coupled to the bracket assembly; and
   a second bracket assembly coupled to the post and a second panel coupled to the second bracket assembly, wherein at least one of the first panel or the second panel is pivotally coupled to the bracket assembly to permit pivotal movement relative to the posts.

20. A sneeze guard comprising:
   at least one post;
   a bracket assembly coupled to the post such that the bracket assembly is movable relative to the post, wherein the bracket assembly includes a locking mechanism that is operable to lock the bracket assembly to the post at a certain location on the post; and
   a panel coupled to the bracket assembly;
   wherein the bracket assembly includes a pair of arms, and further comprising a panel coupled to each arm.

21. A method for protecting displayed food items, the method comprising:
   providing a sneeze guard comprising at least one post having a longitudinal axis defining a length, a bracket assembly coupled to the post such that the bracket assembly is movable relative to the post, wherein the bracket assembly includes a locking mechanism that is operable to lock the bracket assembly to the post at a certain location on the post, and a panel coupled to the bracket assembly; and
   positioning the sneeze guard such that the panel is positioned between displayed food and a viewing location by moving the bracket assembly lengthwise along the longitudinal axis of the post.

22. A method as in claim 21, further comprising operating the locking mechanism to unlock the bracket assembly, and moving the bracket assembly along the post to adjust the height of the panel relative to the food.

23. A method as in claim 21, wherein the bracket assembly further comprises a housing that is receivable about the post and an arm pivotably coupled to the housing, and wherein the panel is coupled to the arm; and further comprising rotating the arm relative to the housing to adjust the angle of the panel relative to the post.

24. A method as in claim 23, wherein the locking mechanism comprises an insert that is disposed within the housing, a locking bar positioned between the housing and the insert, and an actuator to force the locking bar against the insert to cause the insert to constrict about the post, and further comprising operating the actuator to constrict the insert about the post in a non-marking manner.

\* \* \* \* \*

(12) EX PARTE REEXAMINATION CERTIFICATE (8411st)
United States Patent
Yatchak et al.

(10) Number: US 6,588,863 C1
(45) Certificate Issued: Jul. 19, 2011

(54) SNEEZE GUARDS AND METHODS FOR THEIR CONSTRUCTION AND USE

(75) Inventors: Steven Yatchak, Wakefield, MI (US); Chuck DeWitt, Conifer, CO (US)

(73) Assignee: Brass Smith LLC, Denver, CO (US)

Reexamination Request:
No. 90/009,759, Jun. 14, 2010
No. 90/011,241, Sep. 29, 2010

Reexamination Certificate for:
Patent No.: 6,588,863
Issued: Jul. 8, 2003
Appl. No.: 09/580,310
Filed: May 26, 2000

(51) Int. Cl.
*A47B 96/14* (2006.01)

(52) U.S. Cl. .............. 312/140.4; 108/147.11; 211/206; 211/189; 248/222.14; 312/137

(58) Field of Classification Search ............. 312/140.4
See application file for complete search history.

(56) References Cited

U.S. PATENT DOCUMENTS

| | | |
|---|---|---|
| 54,248 A | 4/1866 | Eddy |
| 384,784 A | 6/1888 | Pihl |
| 596,689 A | 1/1898 | Aungst |
| 903,593 A | 11/1908 | Lowendahl |
| 953,156 A | 3/1910 | Rasmussen |
| 959,099 A | 5/1910 | Anderson |
| 964,840 A | 7/1910 | Bemau |
| 1,231,635 A | 7/1917 | Nelson |
| 1,342,626 A | 6/1920 | Frank |
| 1,441,913 A | 1/1923 | Darling |
| 1,507,094 A | 9/1924 | Schoenborn |
| 1,628,623 A | 5/1927 | Jonnes |
| 1,936,529 A | 6/1932 | Taylor |
| 2,163,859 A | 6/1939 | Ver Bockel |
| 2,289,422 A | 7/1942 | Grotnes |
| 2,331,132 A | 10/1943 | Nadelson |
| 2,360,482 A | 10/1944 | Evans |
| 2,741,497 A | 4/1956 | Risley |
| 3,026,162 A | 4/1960 | Waszklewicz |
| 3,113,791 A | 12/1963 | Frost et al. |
| 3,212,713 A | 10/1965 | Culver |
| D206,198 S | 11/1966 | Molitor |
| 3,500,594 A | 3/1970 | O'Brien |
| 3,610,562 A | 10/1971 | Holmes et al. |
| 3,828,403 A | 8/1974 | Perrin et al. |
| 3,921,539 A | 11/1975 | Berger |
| 4,047,684 A | 9/1977 | Kobayashi |
| 4,132,178 A | 1/1979 | Mueller et al. |
| 4,237,798 A | 12/1980 | Welsch et al. |
| 4,286,897 A | 9/1981 | Suskind |
| 4,801,115 A | 1/1989 | Heard |
| 4,860,909 A | 8/1989 | Leumi |
| 4,892,366 A | 1/1990 | Yerman |
| D309,540 S | 7/1990 | Suttles et al. |
| 4,953,819 A | 9/1990 | Davis |
| 5,002,247 A | 3/1991 | Dispenza et al. |
| 5,111,956 A | 5/1992 | Jow |
| 5,199,680 A | 4/1993 | Rivera |
| D337,462 S | 7/1993 | LaVaute et al. |
| 5,351,927 A * | 10/1994 | Howell ................ 248/444.1 |
| 5,359,866 A | 11/1994 | Boddy |
| 5,409,122 A | 4/1995 | Lazarus |
| 5,427,344 A | 6/1995 | Beauchemin |
| 5,509,180 A | 4/1996 | Benetti et al. |
| 5,584,545 A | 12/1996 | LaVaute et al. |
| 5,681,017 A | 10/1997 | Clausen |
| 6,132,018 A | 10/2000 | McGrath |
| 6,328,269 B1 | 12/2001 | Krautloher |
| 2003/0057810 A1 | 3/2003 | DeWitt |

FOREIGN PATENT DOCUMENTS

| | | |
|---|---|---|
| WO | WO 98050728 A1 | 11/1998 |
| WO | WO 98/050728 | 11/1998 |

OTHER PUBLICATIONS

1 Guard Portable Brochure, downloaded on or before Oct. 9, 2007.

2D Adjustable Sneezeguard Brochure, downloaded on or before Oct. 9, 2007.

Ambassador Angled Divider Specifications, downloaded on or before Oct. 9, 2007.

Ambassador Angled Stationary Sneezeguard Specifications, downloaded on or before Oct. 9, 2007.

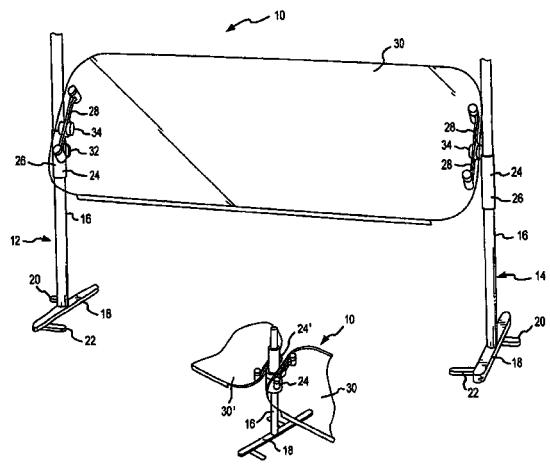

Ambassador Vertical Divider Specifications, downloaded on or before Oct. 9, 2007.
Ambassador Vertical Stationary Sneezeguard Specifications, downloaded on or before Oct. 9, 2007.
Angled Divider Stationary Sneezeguard Specifications, downloaded on or before Oct. 9, 2007.
Canadian Display Systems Inc., http://www.canadiandisplaysystems.com, downloaded Oct. 5, 2007.
Carlisle Food Service Products, Price List, two pages, downloaded 2006.
Carousel Sneezeguard Specifications, two pages, downloaded on or before Oct. 9, 2007.
Document: Deco–Tech Model Deco–900, Adjustable Vertical Display Spec, Jun. 1, 2003.
Document: Vieler International Bistro 1, downloaded on or before Oct. 9, 2007.
Flexaguard Portable Sneeze Guard, http://www.flexaguard.com/index.html. two pages, downloaded on or before Oct. 5, 2007.
Flexaguard Portable Sneeze Guard, Specifications and , http://www.flexaguard.com/spec.html. two pages, downloaded on or before Oct. 5, 2007.
Folding Portable Sneezeguard Installation Brochure and Specification, four pages, downloaded on or before Oct. 9, 2007.
Front Mount Stationary Sneezeguard Brochure, downloaded on or before Oct. 9, 2007.
Kevry Corporation Brochure, Deco 900 Fully Adjustable, General Specifications, downloaded 2007.
Low Profile Folding Portable Sneezeguard Installation Brochure, downloaded on or before Oct. 9, 2007.
High–Profile Folding Portable Sneezeguard Brochure, downloaded on or before Oct. 9, 2007.
Maintenance Solutions Brochure, downloaded on or before Oct. 9, 2007.
Mid–Mount Stationary Sneezeguard Specifications, downloaded on or before Oct. 9, 2007.
Product Information: Brass Smith, Inc.: Hospitality, Sep. 1999.
Product Information: Guard Information, downloaded on or before Oct. 9, 2007.
Product Information: HAFELE Multi–Purpose Pole Mount System 5.106–5.107,downloaded on or before Oct. 9, 2007.
Product Information: IKEA 2003 Holidays at Home.
Product Information: Moffat Bulk Food Regeneration Rolley Model VGEN 8 AIR Product Information, downloaded on or before Oct. 9, 2007.
Product Information: RHO with pictures, downloaded on or before Oct. 9, 2007.
Product Information: Unic Camionnette Dec. 16, 2003.
QBD Modular Systems Inc., Sneezeguard Kits Brochure, downloaded on or before Oct. 9, 2007.
Sampler Sneezeguard Brochure, downloaded on or before Oct. 9, 2007.
Serpentine Sneezeguard Specifications, downloaded on or before Oct. 9, 2007.
Sneezeguard Accessories Brochure, downloaded on or before Oct. 9, 2007.
Sneezeguard Replacement Hardware Brochure, downloaded on or before Oct. 9, 2007.
Sneezeguard Replacement Stands Brochure, downloaded on or before Oct. 9, 2007.
Sneezeguards Specifications: B–445, downloaded on or before Oct. 9, 2007.
Specification Sheet: Moffat Range of Gantrise 6/2 Issue 5, downloaded on or before Oct. 9, 2007.
Specifications: Kevry Deco–Tech Self–Serve Food Shield Portable Rev. 2.3 DECO–270, –271,–272, –273 May 2002.
Storcart Accessories Brochure, downloaded on or before Oct. 9, 2007.
Storcases Brochure, downloaded on or before Oct. 9, 2007.
The Sneezeguard Storcart Specifications, downloaded on or before Oct. 9, 2007.
Vertical Divider Stationary Sneezeguard Specifications, downloaded on or before Oct. 9, 2007.
Vollarth Co., Product Information: Signature Server, Access Breath Guard, downloaded on or before Oct. 9, 2007.
Wall Storage Units Specifications, downloaded on or before Oct. 9, 2007.
Website printout: Bernstein Display: Bravo (www.bernsteindisplay.com) Dec. 21, 2003.
Website printout: Forms + Surfaces: Silhouette Railing System, Profile One Information System (www.forms–surfaces.com). Dec. 21, 2003.
Website printout: IKEA: Solmen Mounting Fitting (www.ikea.com.au), Nov. 9, 2003.
Website printout: RHO (www.rho.ca), Dec. 21, 2003.
Website printout: visplaybeam.com, Gallery Dec. 21, 2003.
Website printout: Visual Store: Illico pole, profile one (www.visualstore.com) Dec. 21, 2003.
Website printout:, CafeProducts.com Food Shields–Sneeze Guards. The Safari Adapta Food Shields, Aug. 16, 2003.

* cited by examiner

*Primary Examiner*—Jeffrey L. Gellner

(57) ABSTRACT

A sneeze guard includes at least one post and a bracket assembly that is coupled to the post. The bracket assembly is configured to be moveable relative to the post and includes a locking mechanism that is operable to lock the bracket assembly to the post at a certain location on the post. Further, a panel is coupled to the bracket assembly.

US 6,588,863 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT PRINTED HEREIN.

Column 7, lines 52-57:

As also shown in FIGS. *14*, *15A*, 15B [and] 16, *and 17*, housing 26 includes *an extension 107 that extends laterally from the housing 26 and that is positioned at an end of the housing 26. The extension 107 includes* a circular section 106 having a plurality of teeth 108. Circular section 106 further includes a threaded hole 110 that is adapted to receive screw 34 (see FIGS. 2 and 3). *Threaded hole 110 includes a transverse axis that is generally orthogonal to the post 16.* In this way, screw 32 may be employed to couple arm 28 to housing 26. *Specifically, the arm 28 may be rotatably coupled to the extension 107 so that the arm 28 is rotatable about the transverse axis.*

Column 7, Line 58- Column 8, line 5:

As best shown in FIGS. 21, 21A and 23, arm 28 also includes a circular section 112 having a plurality of teeth 114. Circular section 112 further includes a through hole 116 through which screw 32 may be inserted. Hence, arm 28 may be coupled to housing 26 *via circular section 106 of extension 107* simply by inserting screw 32 through hole 116 of arm 28 and into threaded hole 110 of circular section 106 of housing 26. Arm 28 may be rotated relative to housing 26 until teeth 114 of arm 28 mesh with teeth 108 of housing 26. Screw 32 may then be tightened to secure the coupling. Such a configuration is particularly advantageous in that arm 28 may be rotated 360° about through hole 116 to permit sneeze guard panel 30 to be positioned at a wide variety of orientations relative to post 16. As the teeth mesh with each other, arm 28 is locked to housing 26 to prevent rotation between the two parts. *When coupled with the housing 26, arm 28 extends substantially orthogonally from the transverse axis of extension 107.*

Column 8, lines 6-16:

As best shown in FIGS. 20 and 20A, ends 40 and 42 each include an opening 118 into which cap 44 (see FIG. 2) is received. Opening 118 includes a ledge 120 upon which the bottom of cap 44 may rest. Opening 118 further includes a flat section 122 that is configured to mate with a corresponding [.] flat section on cap 44. In this way, cap 44 may be keyed relative to opening 118 to prevent relative rotation between cap 44 and end 42. Hence, when a screw (not shown) is inserted into the bottom of end 42 and into cap 44, the screw may be tightened without cap 44 rotating relative to end 42. As the screw is further tightened, cap 44 is pulled against panel 30 (see FIG. 1) to secure panel 30 to arm 28. *Ends 40 and 42 are generally orthogonal to arm 28 and to the transverse axis of extension 107. In this manner, when the panel 30 is secured to arm 28, the panel is laterally offset or spaced apart from the axis of the extension and/or from arm 28. In addition, the arm may extend along the rear side of the panel so as to be separated from a customer by the panel 30.*

+c THE DRAWINGS FIGURES HAVE BEEN CHANGED AS FOLLOWS:

In Figure Nos. 14, 15, 15A, 16 and 17, an added reference numeral 107 and its leading to each figure.

AS A RESULT OF REEXAMINATION, IT HAS BEEN DETERMINED THAT:

Claim 16 is cancelled.

Claims 1, 2, 17-21 and 23 are determined to be patentable as amended.

Claims 3-15, 22 and 24, dependent on an amended claim, are determined to be patentable.

New claims 25-150 are added and determined to be patentable.

1. A sneeze guard comprising:
at least one post having a longitudinal axis defining a length;
a bracket assembly coupled to the post such that the bracket assembly is movable lengthwise relative to the longitudinal axis of the post *along at least a majority of the length of the post while the bracket assembly remains coupled to the post*;
an arm pivotally coupled to and extending from the bracket assembly;
a locking mechanism that *is incorporated with the bracket assembly such that the locking mechanism moves along with the bracket assembly along at least a majority of the length of the post and* is operable to lock the bracket assembly to the post at a certain location relative to the post *such that the bracket assembly is lockable to the post at any location along the post about which the bracket assembly is movable*; and
a *single* panel coupled to the bracket assembly by the arm, *wherein the single panel is the only panel coupled to the arm;* wherein the *single* panel is movable to different angular locations relative to the post by pivoting the arm [and]*, wherein the single panel is constructed of a clear material; and wherein the arm is coupled to the single panel to provide a substantially unobstructed view of food positioned behind the panel when viewed through the panel.*

2. A sneeze guard as in claim 1, wherein the bracket assembly further comprises a housing that is receivable about *a majority of an outer periphery of* the post and wherein the arm is pivotally coupled to the housing.

17. A sneeze guard comprising:
at least one post;
a bracket assembly coupled to the post such that the bracket assembly is movable relative to the post, wherein the bracket assembly includes a locking mechanism that is *movable with the bracket assembly along the post and that is* operable to lock the bracket assembly to the post at [a certain location] *any location along the post where the bracket assembly is movable on the post*; and
a panel coupled to the bracket assembly; wherein the bracket assembly further comprises a housing that is receivable about the post and an arm pivotally coupled to the housing, wherein the panel is coupled to the arm, wherein the arm defines an aperture, and wherein the coupling mechanism comprises a cap insertable into the aperture and a screw to secure the cap to the housing, and wherein the panel is held between the cap and the arm, and wherein the arm defining the aperture and the cap are keyed to prevent rotation of the cap relative to the arm.

18. A sneeze guard comprising:

at least one post;

a bracket assembly coupled to the post such that the bracket assembly is movable relative to the post *along at least a majority of the length of the post while the bracket assembly remains coupled to the post*, wherein the bracket assembly includes a locking mechanism that is *incorporated with the bracket assembly such that the locking mechanism moves along with the bracket assembly along at least a majority of the length of the post and that is* operable to lock the bracket assembly to the post at a certain location on the post *such that the bracket assembly is lockable to the post at any location along the post about which the bracket assembly is moveable*;

a *single* panel *that is constructed of a clear material* pivotally coupled to the bracket assembly; and a second post and a second bracket assembly coupled to the second post, [and] wherein the second bracket assembly is also pivotally coupled to the *single* panel to permit the *single* panel to be pivoted relative to the posts;

wherein the single panel is the only panel coupled to the bracket assemblies; and wherein the bracket assemblies are coupled to the single panel to provide a substantially unobstructed view of food positioned behind the panel when viewed through the panel.

19. A sneeze guard comprising:

at least one post;

a bracket assembly coupled to the *at least one* post such that the bracket assembly is movable relative to the *at least one* post *along at least a majority of the length of the at least one post while the bracket assembly remains coupled to the at least one post*, wherein the bracket assembly includes a locking mechanism *incorporated with the bracket assembly such that the locking mechanism moves along with the bracket assembly along at least a majority of the length of the at least one post and* that is operable to lock the bracket assembly to the *at least one* post at a certain location on the *at least one* post *such that the bracket assembly is lockable to the at least one post at any location along the at least one post about which the bracket assembly is moveable*;

a panel *constructed of a clear material* coupled to the bracket assembly; and a second bracket assembly coupled to the *at least one* post and a second panel coupled to the second bracket assembly, wherein at least one of the first panel or the second panel is pivotally coupled to the bracket assembly to permit pivotal movement relative to the [posts] *at least one post*.

20. A sneeze guard comprising:

at least one post;

a bracket assembly coupled to the *at least one* post such that the bracket assembly is movable relative to the *at least one* post, wherein the bracket assembly includes a locking mechanism that is *movable with the bracket assembly along the at least one post and that is* operable to lock the bracket assembly to the *at least one* post at *any location along the at least one post where the bracket assembly is movable* on the *at least one* post;

and a panel *that is constructed of a clear material* coupled to the bracket assembly; wherein the bracket assembly includes a pair of arms, and further comprising a panel coupled to each arm.

21. A method for protecting displayed food items, the method comprising;

providing a sneeze guard comprising at least one post having a longitudinal axis defining a length, a bracket assembly coupled to the post such that the bracket assembly is movable relative to the post, wherein the bracket assembly includes a locking mechanism that is operable to lock the bracket assembly to the post at a certain location on the post, and a panel *that is constructed of a clear material* coupled to the bracket assembly;

and positioning the sneeze guard such that the panel is positioned between displayed food and a viewing location by moving tthe bracket assembly lengthwise along the longitudinal axis of the post *along at least a majority of the length of the post, wherein both the bracket assembly and the locking mechanism are moved simultaneously as a single unit along the post.*

23. A method as in claim 21, wherein the bracket assembly further comprises a housing that is receivable about *a majority of the periphery of* the post and an arm pivotably coupled to the housing, and wherein the panel is coupled to the arm; and further comprising rotating the arm relative to the housing to adjust the angle of the panel relative to the post.

25. *A sneeze guard comprising:*

*at least one post having a longitudinal axis defining a length;*

*a bracket assembly coupled to the post such that the bracket assembly is movable lengthwise relative to the longitudinal axis of the post;*

*an arm pivotally coupled to and extending from the bracket assembly;*

*a locking mechanism that is operable to lock the bracket assembly to the post at a certain location relative to the post; and*

*a panel coupled to the bracket assembly by the arm, wherein the panel is movable to different angular locations relative to the post by pivoting the arm,*

*wherein the bracket assembly further comprises a housing that is receivable about the post and wherein the arm is pivotally coupled to the housing, wherein the housing includes a plurality of teeth, wherein the arm includes a plurality of teeth to interlock with the housing teeth, and further comprising a screw to pivotally couple the arm to the housing, and wherein the panel is constructed of a clear material.*

26. *A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm,*

*wherein the single panel is the only panel coupled to the arm;*

*wherein the post is cylindrical;*

*wherein the bracket assembly comprises a curved housing disposed about a majority of an outer circumference of* the post so as to be movable along a majority of the length of the post;

wherein the locking assembly is incorporated with the bracket assembly so as to be movable with the bracket assembly, thereby permitting the bracket assembly to be locked to the post anywhere along its movement;

wherein the single panel is constructed of a clear material; and wherein the arm is coupled to the single panel to provide a substantially unobstructed view of food positioned behind the panel when viewed through the panel.

27. A sneeze guard as in claim 26, wherein the housing includes a plurality of teeth, and wherein the arm includes a plurality of teeth to interlock with the housing teeth, and further comprising a screw to pivotally couple the arm to the housing.

28. A sneeze guard as in claim 26, further comprising a screw, wherein the housing includes a threaded aperture configured to threadingly receive the screw, and wherein the arm is pivotally coupled to the bracket assembly by threading the screw into the threaded aperture.

29. A sneeze guard as in claim 26, wherein the locking mechanism is disposed about the post, and wherein the locking mechanism defines a slot that extends longitudinally along at least a portion of the locking mechanism such that the slot allows the locking mechanism to constrict about the post.

30. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only panel coupled to the arm;

wherein the bracket assembly comprises a housing that substantially envelopes an outer periphery of the post so as to be movable along a substantial length of the post while substantially enveloping the outer periphery;

wherein the locking mechanism is incorporated with the bracket assembly so as to move together along the post;

wherein the arm is pivotally coupled to the housing such that the arm is rotatable about a transverse axis that is generally orthogonal to the longitudinal axis, wherein the single panel is constructed of a clear material; and wherein the arm is coupled to the single panel to provide a substantially unobstructed view of food positioned behind the panel when viewed through the panel.

31. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain relative to the post; and a single panel coupled to the bracket assembly by the arm, wherein the single panel is movable to different angular locations relative to the post by pivoting the arm;

wherein the single panel is the only panel coupled to the arm;

wherein the bracket assembly comprises a cylindrical housing that circumscribes the post and an extension that extends from the housing;

wherein the arm is rotatably coupled to the extension so as to rotate about an axis of the extension;

wherein the bracket assembly is disposed about the post such that the housing and locking assembly move together along the post;

wherein the single panel is constructed of a clear material; and wherein the arm is coupled to the single panel to provide a substantially unobstructed view of food positioned behind the panel when viewed through the panel.

32. A sneeze guard as in claim 31, wherein the extension laterally extends from the housing.

33. A sneeze guard as in claim 31, wherein the axis of the extension is orthogonal to the longitudinal axis.

34. A sneeze guard as in claim 31, further comprising a screw, wherein the extension includes a threaded aperture configured to threadingly receive the screw, and wherein the arm is coupled to the extension by threading the screw into the threaded aperture.

35. A sneeze guard as in claim 34, wherein the arm includes a plurality of teeth that facilitate in coupling the arm to the extension.

36. A sneeze guard as in claim 31, wherein the extension includes a plurality of teeth, and wherein the arm includes a plurality of teeth to interlock with the extension teeth, and further comprising a screw to pivotally couple the arm to the extension.

37. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only panel coupled to the arm;

wherein the bracket assembly comprises a housing and an extension that extends from the housing, wherein an axis of the extension is perpendicular to the longitudinal axis of the post, and wherein the axis of the extension is laterally offset from the single panel such that the single panel is laterally spaced apart from the axis of the extension;

wherein the single panel is constructed of a clear material; and wherein the arm is coupled to the single panel to provide a substantially unobstructed view of food positioned behind the panel when viewed through the panel.

38. A sneeze guard as in claim 37, wherein the arm is pivotally coupled to the extension, and wherein the arm extends from the extension such that the arm is substantially orthogonal to the axis of the extension.

39. A sneeze guard as in claim 37, wherein the locking mechanism is incorporated with the bracket assembly such that the locking mechanism moves with the bracket assembly along the post.

40. A sneeze guard as in claim 37, wherein the arm is coupled to the panel by a connector, and wherein the connector is coupled to the panel near an edge of the panel that is adjacent to the post such that the arm does not significantly interfere with a viewing area through the panel.

41. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm; wherein the single panel is movable to different angular locations relative to the post by pivoting the arm;

wherein the single panel is the only panel coupled to the arm;

wherein the bracket assembly comprises a housing disposed about the post and an extension that extends from the housing, wherein the arm is pivotally coupled to the extension such that the arm is rotatable about a transverse axis that is generally orthogonal to the longitudinal axis, wherein the transverse axis is laterally offset from the single panel such that the single panel is laterally spaced apart from the transverse axis;

wherein the single panel is constructed of a clear material; and wherein the arm is coupled to the single panel to provide a substantially unobstructed view of food positioned behind the panel when viewed through the panel.

42. A sneeze guard as in claim 41, wherein the arm is pivotally coupled to the extension, and wherein the arm extends from the extension such that the arm is substantially orthogonal to the axis of the extension.

43. A sneeze guard as in claim 41, wherein the locking mechanism is incorporated with the bracket assembly such that the locking mechanism moves with the bracket assembly along the post.

44. A sneeze guard as in claim 41, wherein the arm is coupled to the panel by a connector, and wherein the connector is coupled to the panel near an edge of the panel that is adjacent to the post such that the arm does not significantly interfere with a viewing area through the panel.

45. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only panel coupled to the arm, and wherein the arm is coupled to the single panel to provided a substantially unobstructed view of food positioned behind the panel when viewed through the panel;

wherein the bracket assembly comprises a housing and an extension that extends from the housing, wherein the extension has an axis that is perpendicular to the longitudinal axis of the post; and a connector at a distal end of the arm, wherein the connector is orthogonal relative to the axis of the extension such that the single panel is laterally spaced apart from the extension when the single panel is coupled to the arm via the connector.

46. A sneeze guard as in claim 45, wherein the arm is pivotally coupled to the extension, and wherein the arm extends from the extension such that the arm is orthogonal to the axis of the extension.

47. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only coupled to the arm;

wherein the arm includes a connector that couples the single panel to the arm, and further comprising a second locking mechanism that is movable along with the bracket assembly as the bracket assembly moves along the post, wherein the second locking mechanism is operable to lock the arm to the bracket assembly;

wherein the single panel is constructed of a clear material; and wherein the arm is coupled to the single panel to provide a substantially unobstructed view of food positioned behind the panel when viewed through the panel.

48. A sneeze guard as in claim 47, wherein the bracket assembly comprises a housing disposed about the post and an extension that extends from the housing, and wherein the second locking mechanism is operable to lock the arm directly to the extension.

49. A sneeze guard as in claim 48, wherein the second locking mechanism comprises a screw and a threaded aperture in the extension, wherein the threaded aperture is configured to threadingly receive the screw, and wherein the arm is locked directly to the extension by threading the screw into the threaded aperture.

50. A sneeze guard as in claim 49, wherein the arm includes a plurality of teeth that facilitate in locking the arm directly to the extension.

51. A sneeze guard as in claim 48, wherein the second locking mechanism comprises:

a plurality of teeth on the extension;

a plurality of teeth on the arm to interlock with the extension teeth, and a screw to directly lock the arm to the extension, wherein the arm is pivotally locked to the extension in one of a plurality of discrete angular position relative to a transverse axis of the extension due to the interlocking of the teeth.

52. A sneeze guard as in claim 47, wherein the second locking mechanism comprises a screw.

53. A sneeze guard as in claim 52, wherein the screw is disposed at a side of the arm.

54. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm;

wherein the panel is constructed of a clear material and is generally rectangular in geometry with a top edge, a bottom edge and two side edges, and wherein at least one of the side edges is generally parallel to the longitudinal axis and is laterally spaced apart from the post; and wherein the panel defines an aperture; and wherein the arm comprises a coupling mechanism including a first coupling member, a second coupling member, and an insert mechanism;

wherein the panel is positioned between the first and second coupling members; and wherein the insert mechanism is positioned through the aperture and secured in relation to the first and second coupling members to thereby couple the panel to the arm.

55. A sneeze guard as in claim 54, wherein the panel does not include a frame.

56. A sneeze guard as in claim 54, wherein the bracket assembly comprises a housing disposed about the post so as to be movable along a majority of the length of the post.

57. A sneeze guard as in claim 54, wherein the locking mechanism is incorporated with the bracket assembly such that the locking mechanism moves with the bracket assembly along the post.

58. A sneeze guard as in claim 57, wherein the insert mechanism comprises a screw.

59. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a single panel coupled to the bracket assembly by the arm, wherein the single panel is movable to different angular locations relative to the post by pivoting the arm;
wherein the single panel is constructed of a clear material that has outer edges defining a periphery,
wherein the arm is connected to the single panel at a location spaced apart from the edge such that all of the outer edges of the single panel are unframed leaving the periphery exposed;
wherein the single panel is the only panel coupled to the arm; and
wherein the arm is coupled to the single panel to provide a substantially unobstructed view of food positioned behind the panel when viewed through the panel.

60. A sneeze guard as in claim 59, wherein the panel defines an aperture; and
wherein the arm comprises a coupling mechanism including a first coupling member, a second coupling member, and an insert mechanism;
wherein the panel is positioned between the first and second coupling members; and
wherein the insert mechanism is positioned through the aperture and secured in relation to the first and second coupling members to thereby couple the panel to the arm.

61. A sneeze guard as in claim 60, wherein the insert mechanism comprises a screw.

62. A sneeze guard as in claim 59, wherein the periphery is rectangular.

63. A sneeze guard as in claim 59, wherein the arm is connected near one of the outer edges to provide a substantially unobstructed view through the panel.

64. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a single panel coupled to the bracket assembly by the arm, wherein the single panel is movable to different angular locations relative to the post by pivoting the arm;
wherein the single panel is the only panel coupled to the arm;
wherein the single panel is constructed of a clear material that has outer edges defining a periphery, wherein the arm is coupled to the single panel near one of the outer edges to provide a substantially unobstructed view through the single panel of food positioned behind the panel;
wherein the single panel has a front side that is adapted to face a customer and a rear side that is adapted to face the food, and wherein the arm is positioned to extend along the rear side of the single panel so as to be separated from the customer by the single panel; and
wherein the locking mechanism is incorporated with the housing so as to move in unison with the housing along the post.

65. A sneeze guard as in claim 64, wherein the arm is connected to the panel such that all of the outer edges of the panel are unframed leaving the periphery exposed.

66. A sneeze guard as in claim 64, wherein the bracket assembly comprises a housing disposed about the post.

67. A sneeze guard as in claim 64, wherein the housing extends entirely about the post.

68. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm;
wherein the panel is constructed of a clear material and defines a hole, wherein the arm includes a connector that extends through the hole to couple the panel to the arm, and wherein the locking mechanism is incorporated with the housing so as to move in unison with the housing along the post.

69. A sneeze guard as in claim 68, wherein the connector is generally cylindrical in geometry.

70. A sneeze guard as in claim 68, wherein the connector comprises a top portion and a bottom portion, and wherein the top portion contacts a top side of the panel that is adapted to face a customer and the bottom portion contacts a bottom side of the panel that is adapted to face food.

71. A sneeze guard as in claim 68, wherein the panel is generally rectangular in geometry with a top edge, a bottom edge and two side edges, and wherein at least one of the side edges is generally parallel to the longitudinal axis and is laterally spaced apart from the post.

72. A sneeze guard comprising:
at least one post having a longitudinal axis defining a length; a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a single panel coupled to the bracket assembly by the arm, wherein the single panel is movable to different angular locations relative to the post by pivoting the arm;
wherein the single panel is the only panel coupled to the arm;
wherein the bracket assembly comprises a housing and an extension that extends from the housing, wherein the bracket assembly is disposed about the post so as to be movable along the post in unison with the locking mechanism;
wherein the housing incudes a centerline that is perpendicular to the longitudinal axis and that bisects the housing, wherein the extension is coupled to the housing so as to be vertically offset from the centerline;
wherein the single panel is constructed of a clear material; and
wherein the arm is coupled to the single panel to provide a substantially unobstructed view of food positioned behind the panel when viewed through the panel.

73. A sneeze guard as in claim 72, wherein the post is cylindrical and wherein the housing circumscribes the post.

74. A sneeze guard as in claim 72, wherein an axis of the extension is substantially parallel to the centerline.

75. A sneeze guard as in claim 72, wherein the arm is coupled to the extension such that the arm extends orthogonally from the extension.

76. A sneeze guard as in claim 75, further comprising a connector coupled to the arm to couple the panel to the arm, wherein the connector extends through a hole in the panel.

77. A sneeze guard as in claim 76, wherein the panel comprises a front face that is adapted to face a customer and a rear face that is adapted to face the food, and wherein the connector couples the panel to the arm such that the arm extends along the rear face of the panel so as to be separated from the customer by the panel.

78. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a first mechanism that is operable to lock the bracket assembly to the post at a certain location relative to the post; and
a panel coupled to the bracket assembly by the arm, wherein the panel is movable to different angular locations relative to the post by pivoting the arm;
wherein the bracket assembly comprises a housing and an extension that extends from the housing,
a second locking mechanism that is operable to lock the arm to the extension, wherein at least one of the arm or the extension includes teeth, and wherein the second locking mechanism moves with the bracket assembly when the bracket assembly moves along the post; and
wherein the panel is constructed of a clear material.

79. A sneeze guard as in claim 78, wherein the first locking mechanism also moves with the bracket assembly so that the bracket assembly moves along the post.

80. A sneeze guard as in claim 78, wherein the bracket assembly is disposed about the post so as to be movable along a majority of the length of the post.

81. A sneeze guard as in claim 78, wherein the second locking mechanism comprises a screw.

82. A sneeze guard as in claim 81, wherein the extension comprises a threaded aperture configured to receive the screw.

83. A sneeze guard as in claim 78, wherein both the arm and the extension include teeth, and wherein the teeth on the arm are configured to interlock with the teeth on the extension.

84. A sneeze guard as in claim 81, wherein the extension is cylindrical, and wherein the extension comprises a threaded aperture concentrically located at a distal end of the extension opposite the post, and wherein the threaded aperture is configured to receive the screw such that arm extends orthogonally from the extension and is pivotally coupled to the extension.

85. A sneeze guard as in claim 84, wherein the connector is connected to the panel near one of the outer edges of the panel to provide a substantially unobstructed view through the panel, and wherein the panel is unframed.

86. A sneeze guard comprising:
at least one post having a longitudinal axis defining a length; a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm;
wherein the bracket assembly comprises a cylindrical housing that is disposed about the post, and further comprising a sleeve disposed between the housing and the post, wherein the sleeve is movable against the post to lock the bracket assembly to the post, and wherein the panel is constructed of a clear material.

87. A sneeze guard as in claim 86, wherein the sleeve comprises a slot to permit the sleeve to lock the bracket assembly to the post by constricting about the post.

88. A sneeze guard as in claim 87, wherein the sleeve comprises a resilient material.

89. A sneeze guard as in claim 87, wherein the slot is parallel to the longitudinal axis.

90. A sneeze guard as in claim 87, wherein the sleeve comprises a smooth inner surface that directly contacts the post so as to avoid scratching or marking the post when constricted about the post.

91. A sneeze guard as in claim 87, further comprising a locking member operable with the sleeve, wherein the locking member applies a force to the sleeve to constrict the sleeve about the post.

92. A sneeze guard as in claim 91, wherein the locking member is threaded.

93. A sneeze guard as in claim 91, wherein the sleeve comprises a solid annular shaped portion that encircles the post.

94. A sneeze guard as in claim 91, wherein the sleeve comprises an engaging portion that corresponds with an engagement region of the locking member to facilitate in applying the constricting force to the sleeve.

95. A sneeze guard as in claim 91, wherein the housing comprises a threaded aperture, and wherein the locking member comprises a screw, and wherein the force is applied to the sleeve by threading the screw into the threaded aperture.

96. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm;
wherein the bracket assembly comprises a housing and an extension that extends from the housing, wherein the arm comprises two laterally spaced apart segments that are each coupled to the panel, and wherein the panel is constructed of a clear material.

97. A sneeze guard as in claim 96, wherein the panel comprises two laterally spaced apart holes, and wherein each of the laterally spaced apart segments comprises a connector, and wherein each of the connectors extends through one of the holes to couple the panel to the arm.

98. A sneeze guard as in claim 96, wherein the arm segments are coupled to the same side of the panel.

99. A sneeze guard as in claim 96, wherein the locking mechanism is incorporated with the bracket assembly such that the locking mechanism moves with the bracket assembly along the post.

100. A sneeze guard as in claim 96, wherein the bracket assembly is disposed about the post so as to be movable along a majority of the length of the post.

101. A sneeze guard comprising:
a first post having a longitudinal axis defining a length;
a first bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm;
wherein the panel is constructed of a clear material; and
further comprising a second post and a second bracket assembly coupled to the second post, and wherein the second bracket assembly is also coupled to the panel so that the second post is coupled with the first post solely by having the panel extend between the first and second bracket assemblies.

102. A sneeze guard as in claim 101, wherein the locking mechanism is incorporated with the bracket assembly such that the locking mechanism moves with the bracket assembly along the post.

103. A sneeze guard as in claim 101, wherein the panel is unframed.

104. A sneeze guard as in claim 101, wherein the panel is rectangular.

105. A sneeze guard as in claim 101, wherein the panel comprises a first edge, a second edge, a top edge, and a bottom edge that define a periphery of the panel, and wherein the first bracket assembly is coupled to the panel toward the periphery of the first edge and the second bracket assembly is coupled to the panel toward the periphery of the second edge to provide a substantially unobstructed view through the panel.

106. A sneeze guard as in claim 101, wherein the first bracket assembly comprises a first housing and a first extension that extends from the first housing, wherein the first arm is coupled with the first extension; and
wherein the second bracket assembly comprises a second housing and a second extension that extends from the second housing, and wherein a second arm is coupled with the second housing.

107. A sneeze guard as in claim 106, further comprising a first screw that locks the first arm with the first extension and a second screw that locks the second arm with the second extension, wherein the first extension comprises a threaded aperture that is configured to receive the first screw and the second extension comprises a threaded aperture that is configured to receive the second screw; and
further comprising a first connector coupled with the first arm and configured to couple with the panel and a second connector coupled with the second arm and configured to couple with the panel, wherein the first connector extends through a first hole in the panel and the second connector extends through a second hole in the panel to couple the panel to the first and second arms.

108. A sneeze guard as in claim 106, wherein at least one of the first arm and the first extension comprise teeth, and wherein at least one of the second arm and the second extension comprise teeth.

109. A sneeze guard as in claim 106, wherein both the first arm and the first extension comprise teeth, and wherein both the second arm and the second extension comprise teeth, and wherein the teeth of the arms interlock with the teeth of the extensions.

110. A sneeze guard as in claim 101, wherein the first bracket assembly comprises a first housing disposed about the first post so as to be movable along a majority of the length of the first post, and wherein the second bracket assembly comprises a second housing disposed about the second post so as to be movable along a majority of the length of the second post.

111. A sneeze guard as in claim 110, wherein the panel is constructed of glass or plastic.

112. A sneeze guard comprising:
at least one post having a longitudinal axis defining a length;
a bracket assembly coupled to the post such that the bracket assembly is movable lengthwise relative to the longitudinal axis of the post;

an arm pivotally coupled to and extending from the bracket assembly;

a locking mechanism disposed about the post that is operable to lock the bracket assembly to the post at a certain location relative to the post; and a panel coupled to the bracket assembly by the arm, wherein the panel is movable to different angular locations relative to the post by pivoting the arm;

wherein the bracket assembly comprises a housing disposed about the post so as to be movable along a substantial length of the post; and wherein the panel is constructed of a clear material; and wherein the locking mechanism comprises a sleeve having an elongate slot that extends along at least a portion of the sleeve to allow the sleeve to constrict about the post.

113. A sneeze guard as in claim 112, wherein the sleeve is constructed of a resilient material.

114. A sneeze guard as in claim 112, further comprising a locking member configured to provide a force to the sleeve to constrict the sleeve about the post.

115. A sneeze guard as in claim 114, wherein the locking member is threaded.

116. A sneeze guard as in claim 112, wherein the sleeve further comprises a solid annular portion that encircles the post.

117. A sneeze guard as in claim 114, wherein the sleeve comprises an engagement portion that corresponds with an engagement region of the locking member to facilitate in constricting the locking mechanism about the post.

118. A sneeze guard as in claim 117, wherein a constricting force is provided as the engagement portion of the locking member is mated with the engagement region of the sleeve.

119. A sneeze guard as in claim 112, wherein the sleeve is cylindrical and wherein the slot is substantially parallel to the longitudinal axis when the sleeve is disposed about the post.

120. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism disposed about the post that is operable to lock the bracket assembly to the post at a certain location relative to the post; and a single panel coupled to the bracket assembly by the arm, wherein the single panel is movable to different angular locations relative to the post by pivoting the arm;

wherein the single panel is constructed of a clear material;

wherein only the arm contacts the single panel;

wherein the single panel is the only panel coupled to the arm;

wherein the arm is coupled to the single panel to provide a substantially unobstructed view of food positioned behind the panel when viewed through the panel;

wherein the bracket assembly and the locking mechanism move simultaneously together along the post; and wherein the locking mechanism secures the single panel in one of a plurality of angular orientations in relation to the post.

121. A sneeze guard as in claim 120, wherein the panel is unframed.

122. A sneeze guard as in claim 120, wherein the arm comprises a connector assembly that couples to the panel such that only the connector assembly contacts the panel.

123. A method for protecting displayed food items, the method comprising:

providing a sneeze guard comprising at least one post having a longitudinal axis defining a length, a bracket assembly coupled to the post such that the bracket assembly is movable relative to the post, wherein the bracket assembly includes a locking mechanism that is operable to lock the bracket assembly to the post at a certain location on the post, and a panel that is constructed of clear material coupled to the bracket assembly;

placing the bracket assembly and locking mechanism about a top end of the post and sliding the bracket assembly and locking mechanism toward a bottom end of the post while the bracket assembly remains positioned about the post; and positioning the sneeze guard such that the panel is positioned between displayed food and a viewing location by moving the bracket assembly lengthwise along the longitudinal axis of the post along at least a substantial distance of the length of the post.

124. A method as in claim 123, further comprising changing the angular orientation of the panel by pivoting an arm coupled to the panel and pivotally coupled to the bracket assembly;

and locking the panel in the angular orientation by securing the arm to the bracket assembly, wherein the panel is contacted only by the arm.

125. A method as in claim 123, wherein the panel is unframed, and wherein the sneeze guard comprises two posts, and wherein each posts includes a bracket assembly that couples with the panel, and wherein the posts are connected only by the panel.

126. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a panel pivotally coupled to the first bracket assembly; and a second post and a second bracket assembly coupled to the second post, and wherein the second bracket assembly is also pivotally coupled to the panel to permit the panel to be pivoted relative to the posts;

an arm pivotally coupled to and extending from at least one of the first or the second bracket assemblies, wherein the panel is movable to different angular locations relative to the post by pivoting the arm;

wherein at least one of the first or the second bracket assemblies comprises a housing that is receivable about its respective post, wherein the arm is pivotally coupled to the housing, wherein the housing includes a plurality of teeth, wherein the arm includes a plurality of teeth to interlock with the housing teeth;

further comprising a screw to pivotally couple the arm to the housing; and wherein the panel is constructed of a clear material.

127. A sneeze guard comprising:

a first post; a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the first and second bracket assemblies; and wherein the first and second bracket assemblies are coupled to the single panel to provide a substantially unobstructed view of food positioned behind the panel when viewed through the panel;

wherein at least one of the first or the second bracket assemblies comprises a housing that is receivable about its respective post so as to be movable along a majority of the length of the post in unison with the locking mechanism, wherein an arm of the bracket assembly is pivotally coupled to the housing such that the arm is rotatable about a transverse axis that is generally orthogonal to the longitudinal axis, and wherein the single panel is constructed of a clear material.

128. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly;

and a second post and a second bracket assembly coupled to the second post, wherein the second bracket assembly is also pivotally coupled to the single panel to permit the single panel to be pivoted relative to the posts;

wherein the single panel is the only panel coupled to the first and second bracket assemblies; and wherein the first and second bracket assemblies are coupled to the single panel to provide a substantially unobstructed view of food positioned behind the panel when viewed through the panel;

wherein at least one of the first or the second bracket assemblies comprises a housing that is receivable about its respective post, wherein the housing comprises an extension that extends from the housing, wherein an axis of the extension is perpendicular to the longitudinal axis of the post and is laterally offset from the single panel such that the single panel is laterally spaced apart from the extension, and wherein the single panel is constructed of a clear material.

129. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly;

and a second post and a second bracket assembly coupled to the second post, wherein the second bracket assembly is also pivotally coupled to the single panel to permit the single panel to be pivoted relative to the posts;

wherein the single panel is the only panel coupled to the first and second bracket assemblies; and wherein the first and second bracket assemblies are coupled to the single panel to provide a substantially unobstructed view of food positioned behind the panel when viewed through the panel;

wherein at least one of the first or the second bracket assemblies comprises a housing that is receivable about its respective post, wherein the housing comprises an extension that extends from the housing and an arm pivotally coupled to the extension such that the arm is rotatable about a transverse axis that is generally orthogonal to the longitudinal axis;

wherein the transverse axis is laterally offset from the single panel such that the single panel is laterally spaced apart from the extension; and wherein the single panel is constructed of a clear material.

130. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the first and second bracket assemblies; and wherein the first and second bracket assemblies are coupled to the single panel to provide a substantially unobstructed view of food positioned behind the panel when viewed through the panel;

an arm pivotally coupled to and extending from at least one of the first or the second bracket assemblies, wherein the single panel is movable to different angular locations relative to the posts by pivoting the arm;

wherein at least one of the first or the second bracket assemblies comprises a housing that is receivable about its respective post and an extension that extends from the housing, wherein an axis of the extension is perpendicular to the longitudinal axis of the post; and a connector at a distal end of the arm, wherein the connector is orthogonal relative to the axis of the extension such that the single panel is laterally spaced apart from the extension when the single panel is coupled to the arm via the connector, and wherein the single panel is constructed of a clear material.

131. A sneeze guard comprising:

a first post;

a first bracket assembly coupled to the first post such that the first bracket assembly is movable relative to the first post, wherein the first bracket assembly includes a first locking mechanism that is operable to lock the first bracket assembly to the first post at a certain location on the first post;

a single panel pivotally coupled to the first bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the first and second bracket assemblies; and wherein the first and second bracket assemblies are coupled to the single panel to provide a substantially unobstructed view of food positioned behind the panel when viewed through the panel;

an arm pivotally coupled to and extending from at least one of the first or the second bracket assemblies, wherein the single panel is movable to different angular locations relative to the posts by pivoting the arm;

wherein the arm includes a connector that couples the single panel to the arm;

further comprising a second locking mechanism that is operable to lock the arm to the bracket assembly, wherein the first and the second locking mechanisms are moveable in unison with the bracket assembly along the post; and wherein the single panel is constructed of a clear material.

132. A sneeze guard comprising:

at least one post;

a bracket assembly coupled to the post such that the bracket assembly is movable relative to the post, wherein the bracket assembly includes a locking mechanism that is operable to lock the bracket assembly to the post at a certain location on the post;

a single panel pivotally coupled to the bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies; and wherein the bracket assemblies are coupled to the single panel to provide a substantially unobstructed view of food positioned behind the panel when viewed through the panel;

wherein the single panel is constructed of a clear material that has outer edges defining a periphery, and wherein an arm of the bracket assembly is connected to the single panel such that all of the outer edges of the single panel are unframed leaving the periphery exposed.

133. A sneeze guard comprising:

at least one post;

a bracket assembly coupled to the post such that the bracket assembly is movable relative to the post, wherein the bracket assembly includes a locking mechanism that is operable to lock the bracket assembly to the post at a certain location on the post;

a single panel pivotally coupled to the bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies;

wherein the single panel is constructed of a clear material that has outer edges defining a periphery, wherein the locking mechanism moves in unison with the bracket assembly along the post, wherein the bracket assemblies each comprise an arm;

wherein the arms are connected to the single panel near opposite outer edges to provide a substantially unobstructed view through the panel of food positioned behind the panel, and wherein the bracket assemblies each comprise a housing disposed about the post so as to be movable along a substantial length of the post.

134. A sneeze guard comprising:

at least one post;

a bracket assembly coupled to the post such that the bracket assembly is movable relative to the post, wherein the bracket assembly includes a locking mechanism that is operable to lock the bracket assembly to the post at a certain location on the post;

a panel pivotally coupled to the bracket assembly; and a second post and a second bracket assembly coupled to the second post, and wherein the second bracket assembly is also pivotally coupled to the panel to permit the panel to be pivoted relative to the posts;

wherein the panel is constructed of a clear material and defines a hole, and wherein an arm of the bracket assembly comprises a connector that extends through the hole to couple the panel to the arm.

135. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies; and wherein the bracket assemblies are coupled to the single panel to provide a substantially unobstructed view of food positioned behind the panel when viewed through the panel;

wherein at least one of the first or the second bracket assemblies comprises a housing that is receivable about its respective post and an extension that extends from the housing, wherein the first bracket assembly is disposed about the first post so as to be movable along a majority of the length of the first post in unison with the locking mechanism; and wherein the housing includes a centerline that is perpendicular to the longitudinal axis and that bisects the housing, and wherein the extension is coupled to he housing so as to be vertically offset from the centerline; and wherein the single panel is constructed of a clear material.

136. A sneeze guard comprising:
a first post;
a first bracket assembly coupled to the first post such that the first bracket assembly is movable relative to the first post, wherein the first bracket assembly includes a locking mechanism that is operable to lock the first bracket assembly to the first post at a certain location on the first post;
a panel pivotally coupled to the first bracket assembly; and
a second post and a second bracket assembly coupled to the second post, and wherein the second bracket assembly is also pivotally coupled to the panel to permit the panel to be pivoted relative to the posts;
wherein at least one of the first or the second bracket assemblies comprises a housing that is receivable about its respective post and an extension that extends from the housing;
an arm pivotally coupled to and extending from at least one of the first or the second the bracket assemblies, wherein the panel is movable to different angular locations relative to the posts by pivoting the arm;
a second locking mechanism that is operable to lock the arm to the extension; wherein at least one of the arm or the extension includes teeth;
wherein the panel is constructed of a clear material; and
wherein the first and second locking mechanism move in unison with the bracket assembly along the post.

137. A sneeze guard comprising:
a first post;
a first bracket assembly coupled to the first post such that the first bracket assembly is movable relative to the first post, wherein the first bracket assembly includes a locking mechanism that is operable to lock the first bracket assembly to the first post at a certain location on the first post;
a panel pivotally coupled to the first bracket assembly; and
a second post and a second bracket assembly coupled to the second post, and wherein the second bracket assembly is also pivotally coupled to the panel to permit the panel to be pivoted relative to the posts;
wherein at least one of the first or the second bracket assemblies comprises a cylindrical housing that is disposed about its respective post, and further comprising a sleeve disposed between the housing and the post, wherein the sleeve is movable against the post to lock the bracket assembly to the post; and
wherein the panel is constructed of a clear material.

138. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and
a panel coupled to the bracket assembly by the arm, wherein the panel is movable to different angular locations relative to the post by pivoting the arm, and wherein the panel is constructed of a clear material; wherein:
the bracket assembly further comprises a housing that is receivable about a majority of an outer periphery of the post and wherein the arm is pivotally coupled to the housing; and
the locking mechanism comprises an insert that is disposed within the housing, a locking bar positioned between the housing and the insert, and an actuator to force the locking bar against the insert to cause the insert to constrict about the post.

139. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and
a panel coupled to the bracket assembly by the arm, wherein the panel is movable to different angular locations relative to the post by pivoting the arm, and wherein the panel is constructed of a clear material; wherein:
the bracket assembly further comprises a housing that is receivable about a majority of an outer periphery of the post and wherein the arm is pivotally coupled to the housing; and
the housing includes a plurality of teeth, wherein the arm includes a plurality of teeth to interlock with the housing teeth, and further comprising a screw to pivotally couple the arm to the housing.

140. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and a panel coupled to the bracket assembly by the arm, wherein the panel is movable to different angular locations relative to the post by pivoting the arm, and wherein the panel is constructed of a clear material; wherein:
the bracket assembly further comprises a housing that is receivable about a majority of an outer periphery of the post and wherein the arm is pivotally coupled to the housing;
the arm includes a coupling mechanism which couples the panel to the arm;
the arm defines an aperture, and
the coupling mechanism comprises a cap insertable into the aperture and a screw to secure the cap to the housing, and wherein the panel is held between the cap and the arm.

141. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable;
a panel coupled to the bracket assembly by the arm, wherein the panel is movable to different angular locations relative to the post by pivoting the arm, and wherein the panel is constructed of a clear material;
a second bracket assembly coupled to the post; and
a second panel coupled to the second bracket assembly.

142. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain relative to the post such that the bracket assembly is lockable to the post at any location along the post about which the bracket assembly is movable; and
a panel coupled to the bracket assembly by the arm, wherein the panel is movable to different angular locations relative to the post by pivoting the arm, and wherein the panel is constructed of a clear material; wherein:
the bracket assembly includes a pair of arms, and further comprising a panel coupled to each arm.

143. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post;
a panel coupled to the bracket assembly by the arm, wherein the panel is movable to different angular locations relative to the post by pivoting the arm, and wherein:
the post is cylindrical;
the bracket assembly comprises a curved housing disposed about a majority of an outer circumference of the post so as to be movable along a majority of the length of the post;
the locking mechanism is incorporated with the bracket assembly so as to be movable with the bracket assembly, thereby permitting the bracket assembly to be locked to the post anywhere along its movement;
the panel is constructed of a clear material;
the housing includes a plurality of teeth; and
the arm includes a plurality of teeth to interlock with the housing teeth; and
further comprising a screw to pivotally couple the arm to the housing.

144. A sneeze guard comprising:
at least one post having a longitudinal axis defining a length; a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm, and wherein:
the post is cylindrical;
the bracket assembly comprises a curved housing disposed about a majority of an outer circumference of the post so as to be movable along a majority of the length of the post;
the locking mechanism is incorporated with the bracket assembly so as to be movable with the bracket assembly, thereby permitting the bracket assembly to be locked to the post anywhere along its movement;
the panel is constructed of a clear material;
the locking mechanism is disposed about the post; and
the locking mechanism defines a slot that extends longitudinally along at least a portion of the locking mechanism such that the slot allows the locking mechanism to constrict about the post.

145. A sneeze guard comprising:
at least one post having a longitudinal axis defining a length;
a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm; and wherein:

the bracket assembly comprises a cylindrical housing that circumscribes the post and an extension that extends from the housing;

the arm is rotatably coupled to the extension so as to rotate about an axis of the extension;

the bracket assembly is disposed about the post such that the housing and locking mechanism move together along the post;

the panel is constructed of a clear material; and the sneeze guard further comprises a screw, wherein:

the extension includes a threaded aperture configured to threadingly receive the screw, the arm is coupled to the extension by threading the screw into the threaded aperture; and the arm includes a plurality of teeth that facilitate in coupling the arm to the extension.

146. A sneeze guard comprising:

at least one post having a longitudinal axis defining a length;

a bracket assembly coupled to the post such that the bracket assembly is movable lengthwise relative to the longitudinal axis of the post; an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm; and wherein:

the bracket assembly comprises a cylindrical housing that circumscribes the post and an extension that extends from the housing;

the arm is rotatably coupled to the extension so as to rotate about an axis of the extension;

the bracket assembly is disposed about the post such that the housing and locking mechanism move together along the post;

the panel is constructed of a clear material;

the extension includes a plurality of teeth, the arm includes a plurality of teeth to interlock with the extension teeth, and the sneeze guard further comprises a screw to pivotally couple the arm to the extension.

147. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm; and wherein:

the arm includes a connector that couples the panel to the arm, and further comprising a second locking mechanism that is movable along with the bracket assembly as the bracket assembly moves along the post, wherein the second locking mechanism is operable to lock the arm to the bracket assembly;

the panel is constructed of a clear material;

the bracket assembly comprises a housing disposed about the post and an extension that extends from the housing;

the second locking mechanism is operable to lock the arm directly to the extension;

the second locking mechanism comprises a screw and a threaded aperture in the extension;

the threaded aperture is configured to threadingly receive the screw;

the arm is locked directly to the extension by threading the screw into the threaded aperture; and the arm includes a plurality of teeth that facilitate in locking the arm directly to the extension.

148. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm; and wherein:

the arm includes a connector that couples the panel to the arm, and further comprising a second locking mechanism that is movable along with the bracket assembly as the bracket assembly moves along the post, wherein the second locking mechanism is operable to lock the arm to the bracket assembly;

the panel is constructed of a clear material;

the bracket assembly comprises a housing disposed about the post and an extension that extends from the housing;

the second locking mechanism is operable to lock the arm directly to the extension; and the second locking mechanism comprises:

a plurality of teeth on the extension;

a plurality of teeth on the arm to interlock with the extension teeth, and a screw to directly lock the arm to the extension, wherein the arm is pivotally locked to the extension in one of a plurality of discrete angular position relative to a transverse axis of the extension due to the interlocking of the teeth.

149. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm; and wherein:

the panel is constructed of a clear material having outer edges defining a periphery;

the arm is connected to the panel at a location spaced apart from the edge such that all of the outer edges of the panel are unframed leaving the periphery exposed;

the panel defines an aperture;

the arm comprises a coupling mechanism including a first coupling member, a second coupling member, and an insert mechanism;

the panel is positioned between the first and second coupling members; and the insert mechanism is positioned through the aperture and secured in relation to the first and second coupling members to thereby couple the panel to the arm.

150. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain relative to the post; and a panel coupled to the bracket assembly by the arm, wherein the panel is movable to different angular locations relative to the post by pivoting the arm; and wherein:

the bracket assembly comprises a housing and an extension that extends from the housing;

the bracket assembly is disposed about the post so as to be movable along the post in unison with the locking mechanism;

the housing includes a centerline that is perpendicular to the longitudinal axis and that bisects the housing;

the extension is coupled to the housing so as to be vertically offset from the centerline;

the panel is constructed of a clear material;

the arm is coupled to the extension such that the arm extends orthogonally from the extension; and the sneeze guard further comprises a connector coupled to the arm to couple the panel to the arm, wherein the connector extends through a hole in the panel.

\* \* \* \* \*

(12) EX PARTE REEXAMINATION CERTIFICATE (9730th)
United States Patent
Yatchak et al.

(10) Number: US 6,588,863 C2
(45) Certificate Issued: Jun. 27, 2013

(54) SNEEZE GUARDS AND METHODS FOR THEIR CONSTRUCTION AND USE

(75) Inventors: Steven Yatchak, Wakefield, MI (US); Chuck DeWitt, Conifer, CO (US)

(73) Assignee: Brass Smith LLC, Denver, CO (US)

Reexamination Request:
No. 90/012,417, Aug. 3, 2012

Reexamination Certificate for:
Patent No.: 6,588,863
Issued: Jul. 8, 2003
Appl. No.: 09/580,310
Filed: May 26, 2000

Reexamination Certificate C1 6,588,863 issued Jul. 19, 2011

(51) Int. Cl.
*A47B 96/14* (2006.01)

(52) U.S. Cl.
USPC ............... 312/140.4; 108/147.11; 211/206; 211/189; 248/222.14; 312/137

(58) Field of Classification Search
None
See application file for complete search history.

(56) References Cited

To view the complete listing of prior art documents cited during the proceeding for Reexamination Control Number 90/012,417, please refer to the USPTO's public Patent Application Information Retrieval (PAIR) system under the Display References tab.

*Primary Examiner* — Catherine S. Williams

(57) ABSTRACT

A sneeze guard includes at least one post and a bracket assembly that is coupled to the post. The bracket assembly is configured to be moveable relative to the post and includes a locking mechanism that is operable to lock the bracket assembly to the post at a certain location on the post. Further, a panel is coupled to the bracket assembly.

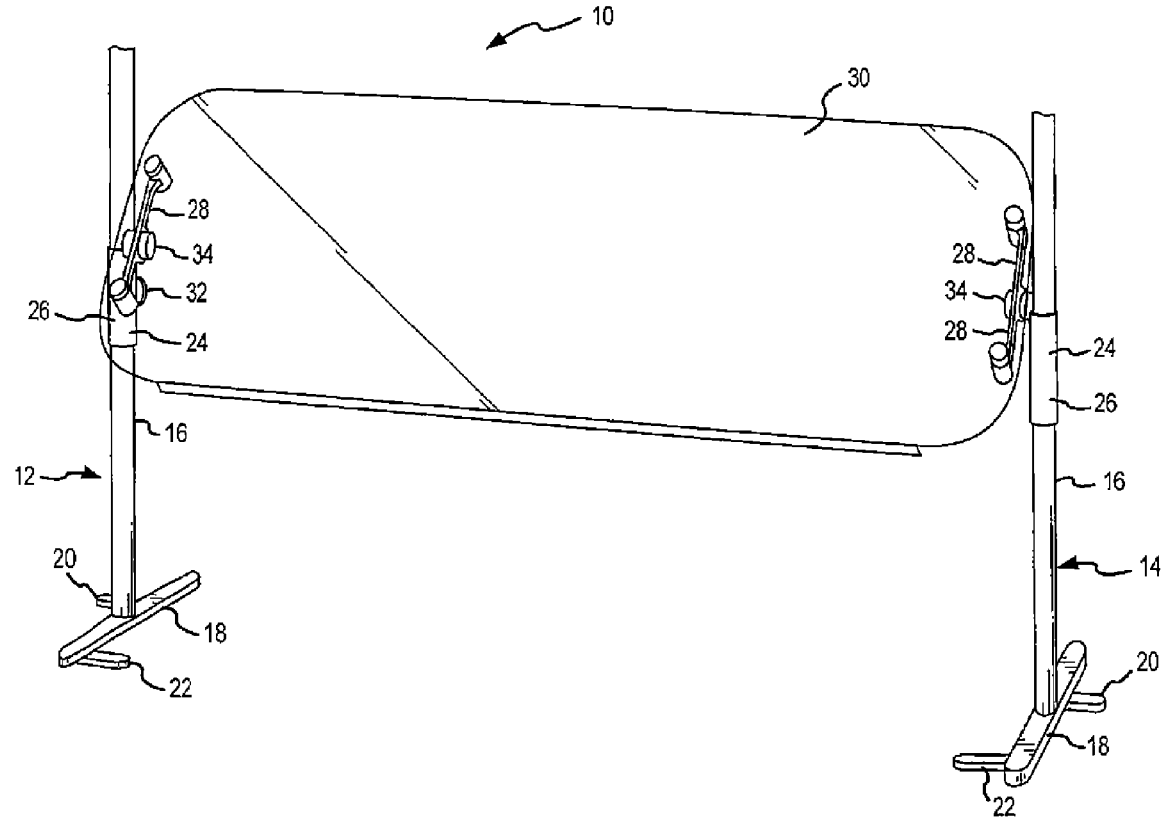

US 6,588,863 C2

1
EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 17, 21, 86, 112, 123, 137, 138, 139, 140, 141, 143, 144 and 148 is confirmed.

Claim 16 was previously cancelled.

Claims 1, 18, 19, 20, 23, 25, 26, 30, 31, 37, 40, 41, 42, 44, 45, 47, 54, 59, 60, 63, 64, 65, 68, 72, 76, 77, 78, 84, 85, 96, 101, 102, 120, 121, 122, 124, 126, 127, 128, 129, 130, 131, 132, 133, 134, 135, 136, 142, 149 and 150 are determined to be patentable as amended.

New claims 151-156 are added and determined to be patentable.

Claims 2-15, 22, 24, 27-29, 32-36, 38-39, 43, 46, 48-53, 55-58, 61-62, 66-67, 69-71, 73-75, 79-83, 87-95, 97-100, 103-111, 113-119, 125 and 145-147 were not reexamined.

1. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and
a single panel coupled to the bracket assembly by the arm, *the single panel comprising a front face, a back face, and four sides, wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces*, wherein the single panel is the only panel coupled to the arm; wherein the single panel is movable to different angular locations relative to the post by pivoting the arm, wherein the single panel is constructed of a clear material; and wherein the arm is coupled to the single panel to provide a substantially unobstructed view of food positioned behind the *single* panel when viewed through the *single* panel.

2

18. A sneeze guard comprising:
at least one post;
a bracket assembly coupled to the post such that the bracket assembly is movable relative to the post along at least a majority of [the] *a* length of the post while the bracket assembly remains coupled to the post, wherein the bracket assembly includes a locking mechanism that is incorporated with the bracket assembly such that the locking mechanism moves along with the bracket assembly along at least a majority of the length of the post and that is operable to lock the bracket assembly to the post at a certain location on the post such that the bracket assembly is lockable to the post at any location along the post about which the bracket assembly is moveable;
a single panel that is constructed of a clear material pivotally coupled to the bracket assembly; and
a second post and a second bracket assembly coupled to the second post, wherein the second bracket assembly is also pivotally coupled to the single panel to permit the single panel to be pivoted relative to the posts;
wherein the single panel is the only panel coupled to the bracket assemblies; and wherein the bracket assemblies are coupled to the single panel to provide a substantially unobstructed view of food positioned behind the *single* panel when viewed through the *single* panel.

19. A sneeze guard comprising:
at least one post;
a bracket assembly coupled to the at least one post such that the bracket assembly is movable relative to the at least one post along at least a majority of [the] *a* length of the at least one post while the bracket assembly remains coupled to the at least one post, wherein the bracket assembly includes a locking mechanism incorporated with the bracket assembly such that the locking mechanism moves along with the bracket assembly along at least a majority of the length of the at least one post and that is operable to lock the bracket assembly to the at least one post at a certain location on the at least one post such that the bracket assembly is lockable to the at least one post at any location along the at least one post about which the bracket assembly is moveable;
a *first* panel constructed of a clear material coupled to the bracket assembly; and
a second bracket assembly coupled to the at least one post and a second panel coupled to the second bracket assembly, wherein at least one of the first panel or the second panel is pivotally coupled to the bracket assembly to permit pivotal movement relative to the at least one post.

20. A sneeze guard comprising:
at least one post;
a bracket assembly coupled to the at least one post such that the bracket assembly is movable relative to the at least one post, wherein the bracket assembly includes a locking mechanism that is movable with the bracket assembly along the at least one post and that is operable to lock the bracket assembly to the at least one post at any location along the at least one post where the bracket assembly is movable on the at least one post;
and a panel that is constructed of a clear material coupled to the bracket assembly; wherein the bracket assembly includes a pair of arms, and further comprising a panel coupled to each arm *such that the panels are positioned on opposite sides of the post*.

23. A method as in claim 21, wherein the bracket assembly further comprises a housing that is receivable about a majority of [the] *a* periphery of the post and an arm pivotably coupled to the housing, and wherein the panel is coupled to the arm; and further comprising rotating the arm relative to the housing to adjust the angle of the panel relative to the post.

25. A sneeze guard comprising:
   at least one post having a longitudinal axis defining a length;
   a bracket assembly coupled to the post such that the bracket assembly is movable lengthwise relative to the longitudinal axis of the post;
   an arm pivotally coupled to and extending from the bracket assembly;
   a locking mechanism that *is incorporated with the bracket assembly such that the locking mechanism moves along with the bracket assembly along at least a majority of the length of the post and is* operable to lock the bracket assembly to the post at a certain location relative to the post *such that the bracket assembly is lockable to the post at any location along the post about which the bracket assembly is movable*; and
   a panel coupled to the bracket assembly by the arm, wherein the panel is movable to different angular locations relative to the post by pivoting the arm,
   wherein the bracket assembly further comprises a housing that is receivable about the post and wherein the arm is pivotally coupled to the housing, wherein the housing includes a plurality of teeth, wherein the arm includes a plurality of teeth to interlock with the housing teeth, and further comprising a screw to pivotally couple the arm to the housing, and wherein the panel is constructed of a clear material.

26. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members that are positioned such that one of the attachment members contacts the front face and the other attachment member contacts the back face of the single panel and wherein the attachment members are compressed against the front and back faces of the single panel*, wherein the single panel is movable to different angular locations relative to the post by pivoting the arm,
   wherein the single panel is the only panel coupled to the arm;
   wherein the post is cylindrical;
   wherein the bracket assembly comprises a curved housing disposed about a majority of an outer circumference of the post so as to be movable along a majority of the length of the post;
   wherein the locking [assembly] *mechanism* is incorporated with the bracket assembly so as to be movable with the bracket assembly, thereby permitting the bracket assembly to be locked to the post anywhere along its movement;
   wherein the single panel is constructed of a clear material; and
   wherein the arm is coupled to the single panel to provide a substantially unobstructed view of food positioned behind the *single* panel when viewed through the *single* panel.

30. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces*, wherein the single panel is movable to different angular locations relative to the post by pivoting the arm;
   wherein the single panel is the only panel coupled to the arm;
   wherein the bracket assembly comprises a housing that substantially envelopes an outer periphery of the post so as to be movable along a substantial length of the post while substantially enveloping the outer periphery;
   wherein the locking mechanism is incorporated with the bracket assembly so as to move together along the post;
   wherein the arm is pivotally coupled to the housing such that the arm is rotatable about a transverse axis that is generally orthogonal to the longitudinal axis,
   wherein the single panel is constructed of a clear material; and
   wherein the arm is coupled to the single panel to provide a substantially unobstructed view of food positioned behind the *single* panel when viewed through the *single* panel.

31. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members that are positioned such that one of the attachment members contacts the front face and the other attachment member contacts the back face of the single panel and wherein the attachment members are compressed against the front and back faces of the single panel*, wherein the single panel is movable to different angular locations relative to the post by pivoting the arm;
   wherein the single panel is the only panel coupled to the arm;
   wherein the bracket assembly comprises a cylindrical housing that circumscribes the post and an extension that extends from the housing;
   wherein the arm is rotatably coupled to the extension so as to rotate about an axis of the extension;
   wherein the bracket assembly is disposed about the post such that the housing and locking assembly move together along the post;
   wherein the single panel is constructed of a clear material; and wherein the arm is coupled to the single panel to provide a substantially unobstructed view of food positioned behind the *single* panel when viewed through the *single* panel.

37. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces*, wherein the single panel is movable to different angular locations relative to the post by pivoting the arm;
wherein the single panel is the only panel coupled to the arm;
wherein the bracket assembly comprises a housing and an extension that extends from the housing, wherein an axis of the extension is perpendicular to the longitudinal axis of the post, and wherein the axis of the extension is laterally offset from the single panel such that the single panel is laterally spaced apart from the axis of the extension;
wherein the single panel is constructed of a clear material; and
wherein the arm is coupled to the single panel to provide a substantially unobstructed view of food positioned behind the *single* panel when viewed through the *single* panel.

40. A sneeze guard as in claim 37, wherein the arm is coupled to the *single* panel by a connector, and wherein the connector is coupled to the *single* panel near an edge of the *single* panel that is adjacent to the post such that the arm does not significantly interfere with a viewing area through the *single* panel.

41. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members that are positioned such that one of the attachment members contacts the front face and the other attachment member contacts the back face of the single panel and wherein the attachment members are compressed against the front and back faces of the single panel*, wherein the single panel is movable to different angular locations relative to the post by pivoting the arm;
wherein the single panel is the only panel coupled to the arm;
wherein the bracket assembly comprises a housing *that is in contact with and* disposed about *an outer periphery of* the post *and that is slidable relative thereto*, and an extension that extends from the housing, wherein the arm is pivotally coupled to the extension such that the arm is rotatable about a transverse axis that is generally orthogonal to the longitudinal axis, wherein the transverse axis is laterally offset from the single panel such that the single panel is laterally spaced apart from the transverse axis;
wherein the single panel is constructed of a clear material; and
wherein the arm is coupled to the single panel to provide a substantially unobstructed view of food positioned behind the *single* panel when viewed through the *single* panel.

42. A sneeze guard as in claim 41, wherein the arm is pivotally coupled to the extension, and wherein the arm extends from the extension such that the arm is substantially orthogonal to [the] *an* axis of the extension.

44. A sneeze guard as in claim 41, wherein the arm is coupled to the *single* panel by a connector, and wherein the connector is coupled to the *single* panel near an edge of the *single* panel that is adjacent to the post such that the arm does not significantly interfere with a viewing area through the *single* panel.

45. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, wherein the single panel is movable to different angular locations relative to the post by pivoting the arm, *wherein the arm pivots about a pivot point, and wherein the pivot point of the arm is located between a top edge and a bottom edge of the single panel when a front face of the single panel is substantially parallel with the longitudinal axis of the post*;
wherein the single panel is the only panel coupled to the arm, and wherein the arm is coupled to the single panel to provide a substantially unobstructed view of food positioned behind the *single* panel when viewed through the *single* panel;
wherein the bracket assembly comprises a housing and an extension that extends from the housing, wherein the extension has an axis that is perpendicular to the longitudinal axis of the post; and
a connector at a distal end of the arm, wherein the connector is orthogonal relative to the axis of the extension such that the single panel is laterally spaced apart from the extension when the single panel is coupled to the arm via the connector.

47. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, *the single panel comprising a front face, a back face, and four sides, wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces*, wherein the single panel is movable to different angular locations relative to the post by pivoting the arm;

wherein the single panel is the only panel coupled to the arm;

wherein the arm includes a connector that couples the single panel to the arm, and further comprising a second locking mechanism that is movable along with the bracket assembly as the bracket assembly moves along the post, wherein the second locking mechanism is operable to lock the arm to the bracket assembly;

wherein the single panel is constructed of a clear material; and wherein the arm is coupled to the single panel to provide a substantially unobstructed view of food positioned behind the *single* panel when viewed through the *single* panel.

54. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is *incorporated with the bracket assembly such that the locking mechanism moves along with the bracket assembly along at least a majority of the length of the post and is* operable to lock the bracket assembly to the post at a certain location relative to the post *such that the bracket assembly is lockable to the post at any location along the post about which the bracket assembly is movable*; and a panel coupled to the bracket assembly by the arm, wherein the panel is movable to different angular locations relative to the post by pivoting the arm;

wherein the panel is constructed of a clear material and is generally rectangular in geometry with a top edge, a bottom edge and two side edges, and wherein at least one of the side edges is generally parallel to the longitudinal axis and is laterally spaced apart from the post; and wherein the panel defines an aperture; and wherein the arm comprises a coupling mechanism including a first coupling member, a second coupling member, and an insert mechanism;

wherein the panel is positioned between the first and second coupling members; and wherein the insert mechanism is positioned through the aperture and secured in relation to the first and second coupling members to thereby couple the panel to the arm.

59. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is *incorporated with the bracket assembly such that the locking mechanism moves along with the bracket assembly along at least a majority of the length of the post and is* operable to lock the bracket assembly to the post at a certain location relative to the post *such that the bracket assembly is lockable to the post at any location along the post about which the bracket assembly is movable*; and a single panel coupled to the bracket assembly by the arm, wherein the single panel is movable to different angular locations relative to the post by pivoting the arm;

wherein the single panel is constructed of a clear material that has outer edges defining a periphery, wherein the arm is connected to the single panel at a location spaced apart from [the] *an* edge such that all of the outer edges of the single panel are unframed leaving the periphery exposed;

wherein the single panel is the only panel coupled to the arm; and wherein the arm is coupled to the single panel to provide a substantially unobstructed view of food positioned behind the *single* panel when viewed through the *single* panel.

60. A sneeze guard as in claim 59, wherein the *single* panel defines an aperture; and wherein the arm comprises a coupling mechanism including a first coupling member, a second coupling member, and an insert mechanism;

wherein the *single* panel is positioned between the first and second coupling members; and wherein the insert mechanism is positioned through the aperture and secured in relation to the first and second coupling members to thereby couple the *single* panel to the arm.

63. A sneeze guard as in claim 59, wherein the arm is connected near one of the outer edges to provide a substantially unobstructed view through the *single* panel.

64. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only panel coupled to the arm;

wherein the single panel is constructed of a clear material that has outer edges defining a periphery, wherein the arm is coupled to the single panel near one of the outer edges to provide a substantially unobstructed view through the single panel of food positioned behind the *single* panel;

wherein the single panel has a front side that is adapted to face a customer and a rear side that is adapted to face the food, and wherein the arm is positioned to extend along the rear side of the single panel so as to be separated from the customer by the single panel; and wherein the locking mechanism is incorporated with [the] *a* housing so as to move in unison with the housing along the post.

65. A sneeze guard as in claim 64, wherein the arm is connected to the *single* panel such that all of the outer edges of the *single* panel are unframed leaving the periphery exposed.

68. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a panel coupled to the bracket assembly by the arm, wherein the panel is movable to different angular locations relative to the post by pivoting the arm;

wherein the panel is constructed of a clear material and defines a hole, wherein the arm includes a connector that extends through the hole to couple the panel to the arm, and wherein the locking mechanism is incorporated with [the] *a* housing so as to move in unison with the housing along the post.

72. A sneeze guard comprising:

at least one post having a longitudinal axis defining a length; a bracket assembly coupled to the post such that the bracket assembly is movable lengthwise relative to the longitudinal axis of the post;

an arm pivotally coupled to and extending from the bracket assembly;

a locking mechanism that is operable to lock the bracket assembly to the post at a certain location relative to the post; and a single panel coupled to the bracket assembly by the arm, wherein the single panel is movable to different angular locations relative to the post by pivoting the arm;

wherein the single panel is the only panel coupled to the arm;

wherein the bracket assembly comprises a housing and an extension that extends from the housing, wherein the bracket assembly is disposed about the post so as to be movable along the post in unison with the locking mechanism;

wherein the housing includes a centerline that is perpendicular to the longitudinal axis and that bisects the housing, wherein the extension is coupled to the housing so as to be vertically offset from the centerline;

wherein the single panel is constructed of a clear material; and wherein the arm is coupled to the single panel to provide a substantially unobstructed view of food positioned behind the *single* panel when viewed through the *single* panel.

76. A sneeze guard as in claim 75, further comprising a connector coupled to the arm to couple the *single* panel to the arm, wherein the connector extends through a hole in the *single* panel.

77. A sneeze guard as in claim 76, wherein the *single* panel comprises a front face that is adapted to face a customer and a rear face that is adapted to face the food, and wherein the connector couples the *single* panel to the arm such that the arm extends along the rear face of the *single* panel so as to be separated from the customer by the *single* panel.

78. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a first *locking* mechanism that is operable to lock the bracket assembly to the post at a certain location relative to the post; and a panel coupled to the bracket assembly by the arm, *the panel comprising a front face, a back face, and four sides, wherein the arm includes a coupling arrangement that comprises a pair of opposing attachment members that are positioned such that one of the attachment members contacts the front face and the other attachment member contacts the back face of the panel and wherein the attachment members are compressed against the front and back faces of the panel*, wherein the panel is movable to different angular locations relative to the post by pivoting the arm;

wherein the bracket assembly comprises a housing and an extension that extends from the housing, a second locking mechanism that is operable to lock the arm to the extension, wherein at least one of the arm or the extension includes teeth, and wherein the second locking mechanism moves with the bracket assembly when the bracket assembly moves along the post; and wherein the panel is constructed of a clear material.

84. A sneeze guard as in claim 81, wherein the extension is cylindrical, and wherein the extension comprises a threaded aperture concentrically located at a distal end of the extension opposite the post, and wherein the threaded aperture is configured to receive the screw such that *the* arm extends orthogonally from the extension and is pivotally coupled to the extension.

85. A sneeze guard as in claim 84, wherein [the] *a* connector is connected to the panel near [one of the] *an* outer [edges] *edge* of the panel to provide a substantially unobstructed view through the panel, and wherein the panel is unframed.

96. A sneeze guard comprising:

at least one post having a longitudinal axis defining a length;

a bracket assembly coupled to the post such that the bracket assembly is movable lengthwise relative to the longitudinal axis of the post;

an arm pivotally coupled to and extending from the bracket assembly;

a locking mechanism that is *incorporated with the bracket assembly such that the locking mechanism moves along with the bracket assembly along at least a majority of the length of the post and is* operable to lock the bracket assembly to the post at a certain location relative to the post *such that the bracket assembly is lockable to the post at any location along the post about which the bracket assembly is movable*; and a panel coupled to the bracket assembly by the arm, *the panel comprising a front face, a back face, and four sides, wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces*, wherein the panel is movable to different angular locations relative to the post by pivoting the arm;

wherein the bracket assembly comprises a housing and an extension that extends from the housing, wherein the arm comprises two laterally spaced apart segments that are each coupled to the panel, and wherein the panel is constructed of a clear material.

101. A sneeze guard comprising:

a first post having a longitudinal axis defining a length;

a first bracket assembly coupled to the post such that the *first* bracket assembly is movable lengthwise relative to the longitudinal axis of the post;

[an] *a first* arm pivotally coupled to and extending from the *first* bracket assembly;

a locking mechanism that is *incorporated with the first bracket assembly such that the locking mechanism moves along with the first bracket assembly along at least a majority of the length of the post and is* operable to lock the *first* bracket assembly to the post at a certain location relative to the post *such that the first bracket assembly is lockable to the post at any location along the post about which the first bracket assembly is movable*; and a panel coupled to the *first* bracket assembly by the *first* arm, wherein the panel is movable to different angular locations relative to the post by pivoting the *first* arm;

wherein the panel is constructed of a clear material; and further comprising a second post and a second bracket assembly coupled to the second post, and wherein the second bracket assembly is also coupled to the panel so that the second post is coupled with the first post solely by having the panel extend between the first and second bracket assemblies.

102. A sneeze guard as in claim 101, wherein the locking mechanism is incorporated with the *first* bracket assembly such that the locking mechanism moves with the *first* bracket assembly along the post.

120. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism disposed about the post that is operable to lock the bracket assembly to the post at a certain location relative to the post; and
a single panel coupled to the bracket assembly by the arm, wherein the single panel is movable to different angular locations relative to the post by pivoting the arm;
wherein the single panel is constructed of a clear material;
wherein only the arm contacts the single panel;
wherein the single panel is the only panel coupled to the arm;
wherein the arm is coupled to the single panel to provide a substantially unobstructed view of food positioned behind the *single* panel when viewed through the *single* panel;
wherein the bracket assembly and the locking mechanism move simultaneously together along the post; and
wherein the locking mechanism secures the single panel in one of a plurality of angular orientations in relation to the post.

121. A sneeze guard as in claim 120, wherein the *single* panel is unframed.

122. A sneeze guard as in claim 120, wherein the arm comprises a connector assembly that couples to the *single* panel such that only the connector assembly contacts the *single* panel.

124. A method as in claim 123, further comprising changing [the] *an* angular orientation of the panel by pivoting an arm coupled to the panel and pivotally coupled to the bracket assembly;
and locking the panel in the angular orientation by securing the arm to the bracket assembly, wherein the panel is contacted only by the arm.

126. A sneeze guard comprising:
a first post;
a first bracket assembly coupled to the first post such that the first bracket assembly is movable relative to the first post *along at least a majority of a length of the first post*, wherein the first bracket assembly includes a locking mechanism that is operable to lock the first bracket assembly to the first post at a certain location on the first post *such that the first bracket assembly is lockable to the first post at any location along the first post about which the first bracket assembly is movable*;
a panel pivotally coupled to the first bracket assembly; and
a second post and a second bracket assembly coupled to the second post, and wherein the second bracket assembly is also pivotally coupled to the panel to permit the panel to be pivoted relative to the posts;
an arm pivotally coupled to and extending from at least one of the first or the second bracket assemblies, wherein the panel is movable to different angular locations relative to the post by pivoting the arm;
wherein at least one of the first or the second bracket assemblies comprises a housing that is receivable about its respective post, wherein the arm is pivotally coupled to the housing, wherein the housing includes a plurality of teeth, wherein the arm includes a plurality of teeth to interlock with the housing teeth;
further comprising a screw to pivotally couple the arm to the housing; and
wherein the panel is constructed of a clear material.

127. A sneeze guard comprising:
a first post; a first bracket assembly coupled to the first post such that the first bracket assembly is movable relative to the first post, wherein the first bracket assembly includes a locking mechanism that is operable to lock the first bracket assembly to the first post at a certain location on the first post;
a single panel pivotally coupled to the first bracket assembly; and
a second post and a second bracket assembly coupled to the second post, wherein the second bracket assembly is also pivotally coupled to the single panel to permit the single panel to be pivoted relative to the posts;
wherein the single panel is the only panel coupled to the first and second bracket assemblies; and
wherein the first and second bracket assemblies are coupled to the single panel to provide a substantially unobstructed view of food positioned behind the *single* panel when viewed through the *single* panel;
wherein at least one of the first or the second bracket assemblies comprises a housing that is receivable about its respective post so as to be movable along a majority of [the] *a* length of the *respective* post in unison with the *respective* locking mechanism, wherein an arm of the *respective* bracket assembly is pivotally coupled to the housing such that the arm is rotatable about a transverse axis that is generally orthogonal to [the] *a* longitudinal axis *of the respective post*, and wherein the single panel is constructed of a clear material.

128. A sneeze guard comprising:
a first post;
a first bracket assembly coupled to the first post such that the first bracket assembly is movable relative to the first post, wherein the first bracket assembly includes a locking mechanism that is operable to lock the first bracket assembly to the first post at a certain location on the first post;
a single panel pivotally coupled to the first bracket assembly *by an arm, wherein the arm pivots about a pivot point, and wherein the pivot point of the arm is located between a top edge and a bottom edge of the single panel*

*when a front face of the single panel is substantially parallel with a longitudinal axis of the first post;*
and a second post and a second bracket assembly coupled to the second post, wherein the second bracket assembly is also pivotally coupled to the single panel to permit the single panel to be pivoted relative to the posts;
wherein the single panel is the only panel coupled to the first and second bracket assemblies; and
wherein the first and second bracket assemblies are coupled to the single panel to provide a substantially unobstructed view of food positioned behind the *single* panel when viewed through the *single* panel;
wherein at least one of the first or the second bracket assemblies comprises a housing that is receivable about its respective post, wherein the housing comprises an extension that extends from the housing, wherein an axis of the extension is perpendicular to the longitudinal axis of the post and is laterally offset from the single panel such that the single panel is laterally spaced apart from the extension, and wherein the single panel is constructed of a clear material.

129. A sneeze guard comprising:
a first post;
a first bracket assembly coupled to the first post such that the first bracket assembly is movable relative to the first post, wherein the first bracket assembly includes a locking mechanism that is operable to lock the first bracket assembly to the first post at a certain location on the first post;
a single panel pivotally coupled to the first bracket assembly;
and a second post and a second bracket assembly coupled to the second post, wherein the second bracket assembly is also pivotally coupled to the single panel to permit the single panel to be pivoted relative to the posts;
wherein the single panel is the only panel coupled to the first and second bracket assemblies; and
wherein the first and second bracket assemblies are coupled to the single panel to provide a substantially unobstructed view of food positioned behind the *single* panel when viewed through the *single* panel;
wherein at least one of the first or the second bracket assemblies comprises a housing that is receivable about *an outer periphery of* its respective post *and that is slidable relative thereto*, wherein the housing comprises an extension that extends from the housing and an arm pivotally coupled to the extension such that the arm is rotatable about a transverse axis that is generally orthogonal to [the] *a* longitudinal axis *of the respective post*;
wherein the transverse axis is laterally offset from the single panel such that the single panel is laterally spaced apart from the extension; and
wherein the single panel is constructed of a clear material.

130. A sneeze guard comprising:
a first post;
a first bracket assembly coupled to the first post such that the first bracket assembly is movable relative to the first post, wherein the first bracket assembly includes a locking mechanism that is operable to lock the first bracket assembly to the first post at a certain location on the first post;
a single panel pivotally coupled to the first bracket assembly *by an arm, wherein the arm pivots about a pivot point, and wherein the pivot point of the arm is located between a top edge and a bottom edge of the single panel when a front face of the single panel is substantially parallel with a longitudinal axis of the first post;* and
a second post and a second bracket assembly coupled to the second post, wherein the second bracket assembly is also pivotally coupled to the single panel to permit the single panel to be pivoted relative to the posts;
wherein the single panel is the only panel coupled to the first and second bracket assemblies; and
wherein the first and second bracket assemblies are coupled to the single panel to provide a substantially unobstructed view of food positioned behind the *single* panel when viewed through the *single* panel;
[an] *the* arm *being* pivotally coupled to and extending from at least one of the first or the second bracket assemblies, wherein the single panel is movable to different angular locations relative to the posts by pivoting the arm;
wherein at least one of the first or the second bracket assemblies comprises a housing that is receivable about its respective post and an extension that extends from the housing, wherein an axis of the extension is perpendicular to the longitudinal axis of the post; and
a connector at a distal end of the arm, wherein the connector is orthogonal relative to the axis of the extension such that the single panel is laterally spaced apart from the extension when the single panel is coupled to the arm via the connector, and wherein the single panel is constructed of a clear material.

131. A sneeze guard comprising:
a first post;
a first bracket assembly coupled to the first post such that the first bracket assembly is movable relative to the first post, wherein the first bracket assembly includes a first locking mechanism that is *incorporated with the first bracket assembly such that the first locking mechanism moves along with the first bracket assembly along at least a majority of a length of the first post and is* operable to lock the first bracket assembly to the first post at a certain location on the first post *such that the first bracket assembly is lockable to the first post at any location along the first post about which the first bracket assembly is movable*;
a single panel pivotally coupled to the first bracket assembly; and a second post and a second bracket assembly coupled to the second post, wherein the second bracket assembly is also pivotally coupled to the single panel to permit the single panel to be pivoted relative to the posts;
wherein the single panel is the only panel coupled to the first and second bracket assemblies; and
wherein the first and second bracket assemblies are coupled to the single panel to provide a substantially unobstructed view of food positioned behind the *single* panel when viewed through the *single* panel;
an arm pivotally coupled to and extending from at least one of the first or the second bracket assemblies, wherein the single panel is movable to different angular locations relative to the posts by pivoting the arm;
wherein the arm includes a connector that couples the single panel to the arm;
further comprising a second locking mechanism that is operable to lock the arm to the *respective* bracket assembly, wherein the first and the second locking mechanisms are moveable in unison with the *respective* bracket assembly along the post; and
wherein the single panel is constructed of a clear material.

132. A sneeze guard comprising:

at least one post;

a bracket assembly coupled to the post such that the bracket assembly is movable relative to the post, wherein the bracket assembly includes a locking mechanism that is *incorporated with the bracket assembly such that the locking mechanism moves along with the bracket assembly along at least a majority of a length of the post and is* operable to lock the bracket assembly to the post at a certain location on the post *such that the bracket assembly is lockable to the post at any location along the post about which the bracket assembly is movable*;

a single panel pivotally coupled to the bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies; and wherein the bracket assemblies are coupled to the single panel to provide a substantially unobstructed view of food positioned behind the *single* panel when viewed through the *single* panel;

wherein the single panel is constructed of a clear material that has outer edges defining a periphery, and wherein an arm of the bracket assembly is connected to the single panel such that all of the outer edges of the single panel are unframed leaving the periphery exposed.

133. A sneeze guard comprising:

at least one post;

a bracket assembly coupled to the post such that the bracket assembly is movable relative to the post, wherein the bracket assembly includes a locking mechanism that is operable to lock the bracket assembly to the post at a certain location on the post;

a single panel pivotally coupled to the bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies;

wherein the single panel is constructed of a clear material that has outer edges defining a periphery, wherein the locking mechanism moves in unison with the bracket assembly along the post, wherein the bracket assemblies each comprise an arm;

wherein the arms are connected to the single panel near opposite outer edges to provide a substantially unobstructed view through the panel of food positioned behind the *single* panel, and wherein the bracket assemblies each comprise a housing disposed about the post so as to be movable along a substantial length of the post.

134. A sneeze guard comprising:

at least one post;

a bracket assembly coupled to the post such that the bracket assembly is movable relative to the post, wherein the bracket assembly includes a locking mechanism that is *incorporated with the bracket assembly such that the locking mechanism moves along with the bracket assembly along at least a majority of a length of the post and is* operable to lock the bracket assembly to the post at a certain location on the post *such that the bracket assembly is lockable to the post at any location along the post about which the bracket assembly is movable*;

a panel pivotally coupled to the bracket assembly; and a second post and a second bracket assembly coupled to the second post, and wherein the second bracket assembly is also pivotally coupled to the panel to permit the panel to be pivoted relative to the posts;

wherein the panel is constructed of a clear material and defines a hole, and wherein an arm of the bracket assembly comprises a connector that extends through the hole to couple the panel to the arm.

135. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a single panel pivotally coupled to the first bracket assembly; and a second post and a second bracket assembly coupled to the second post, wherein the second bracket assembly is also pivotally coupled to the single panel to permit the single panel to be pivoted relative to the posts;

wherein the single panel is the only panel coupled to the bracket assemblies; and wherein the bracket assemblies are coupled to the single panel to provide a substantially unobstructed view of food positioned behind the single panel when viewed through the *single* panel;

wherein at least one of the first or the second bracket assemblies comprises a housing that is receivable about its respective post and an extension that extends from the housing, wherein the first bracket assembly is disposed about the first post so as to be movable along a majority of [the] *a* length of the first post in unison with the locking mechanism; and wherein the housing includes a centerline that is perpendicular to [the] *a* longitudinal axis *of the respective post* and that bisects the housing, and wherein the extension is coupled to [he] *the* housing so as to be vertically offset from the centerline; and wherein the single panel is constructed of a clear material.

136. A sneeze guard comprising:

a first post;

a first bracket assembly coupled to the first post such that the first bracket assembly is movable relative to the first post, wherein the first bracket assembly includes a locking mechanism that is operable to lock the first bracket assembly to the first post at a certain location on the first post;

a panel pivotally coupled to the first bracket assembly; and a second post and a second bracket assembly coupled to the second post, and wherein the second bracket assembly is also pivotally coupled to the panel to permit the panel to be pivoted relative to the posts;

wherein at least one of the first or the second bracket assemblies comprises a housing that is receivable about *an outer periphery of* its respective post *and that is slidable relative thereto*, and an extension that extends from the housing;

an arm pivotally coupled to and extending from at least one of the first or the second the bracket assemblies, wherein the panel is movable to different angular locations relative to the posts by pivoting the arm;

a second locking mechanism that is operable to lock the arm to the extension; wherein at least one of the arm or the extension includes teeth;

wherein the panel is constructed of a clear material; and
wherein the first and second locking mechanism move in unison with the bracket assembly along the post.

142. A sneeze guard comprising:
at least one post having a longitudinal axis defining a length;
a bracket assembly coupled to the post such that the bracket assembly is movable lengthwise relative to the longitudinal axis of the post along at least a majority of the length of the post while the bracket assembly remains coupled to the post;
an arm pivotally coupled to and extending from the bracket assembly;
a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and
a panel coupled to the bracket assembly by the arm, wherein the panel is movable to different angular locations relative to the post by pivoting the arm, and wherein the panel is constructed of a clear material; wherein:
the bracket assembly includes a pair of arms, and further comprising a panel coupled to each arm *such that the panels are positioned on opposite sides of the post.*

149. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is *incorporated with the bracket assembly such that the locking mechanism moves along with the bracket assembly along at least a majority of the* length of the post and is operable to lock the bracket assembly to the post at a certain location relative to the post *such that the bracket assembly is lockable to the post at any location along the post about which the bracket assembly is movable;* and
a panel coupled to the bracket assembly by the arm, wherein the panel is movable to different angular locations relative to the post by pivoting the arm; and wherein:
the panel is constructed of a clear material having outer edges defining a periphery;
the arm is connected to the panel at a location spaced apart from [the] *an* edge such that all of the outer edges of the panel are unframed leaving the periphery exposed;
the panel defines an aperture;
the arm comprises a coupling mechanism including a first coupling member, a second coupling member, and an insert mechanism;
the panel is positioned between the first and second coupling members; and
the insert mechanism is positioned through the aperture and secured in relation to the first and second coupling members to thereby couple the panel to the arm.

150. A sneeze guard comprising:
at least one post having a longitudinal axis defining a length;
a bracket assembly coupled to the post such that the bracket assembly is movable lengthwise relative to the longitudinal axis of the post;
an arm pivotally coupled to and extending from the bracket assembly;
a locking mechanism that is operable to lock the bracket assembly to the post at a certain location relative to the post; and
a panel coupled to the bracket assembly by the arm, wherein the panel is movable to different angular locations relative to the post by pivoting the arm, *wherein the arm pivots about a pivot point, and wherein the pivot point of the arm is located between a top edge and a bottom edge of the panel when a front face of the panel is substantially parallel with the longitudinal axis of the post;* and wherein:
the bracket assembly comprises a housing and an extension that extends from the housing;
the bracket assembly is disposed about the post so as to be movable along the post in unison with the locking mechanism;
the housing includes a centerline that is perpendicular to the longitudinal axis and that bisects the housing;
the extension is coupled to the housing so as to be vertically offset from the centerline;
the panel is constructed of a clear material;
the arm is coupled to the extension such that the arm extends orthogonally from the extension; and
the sneeze guard further comprises a connector coupled to the arm to couple the panel to the arm, wherein the connector extends through a hole in the panel.

*151. A sneeze guard comprising: at least one post having a longitudinal axis defining a length; a bracket assembly coupled to the post such that the bracket assembly is movable lengthwise relative to the longitudinal axis of the post; an arm pivotally coupled to and extending from the bracket assembly; a locking mechanism that is operable to lock the bracket assembly to the post at a certain location relative to the post; and a single panel coupled to the bracket assembly by the arm, the single panel comprising a front face, a back face, and four sides, wherein the single panel is movable to different angular locations relative to the post by pivoting the arm, wherein the arm pivots about a pivot point that is located between a top edge and a bottom edge of the single panel, and wherein the arm includes a coupling arrangement comprising a pair of opposing attachment members, wherein one of the opposing attachment members is positioned on the front face and the other opposing attachment member is positioned on the back face, and wherein the opposing attachment members are compressed against the front and back faces;*
*wherein the single panel is the only panel coupled to the arm, and wherein the arm is coupled to the single panel to provide a substantially unobstructed view of food positioned behind the single panel when viewed through the single panel;*
*wherein the bracket assembly comprises a housing and an extension that extends from the housing, wherein the extension has an axis that is perpendicular to the longitudinal axis of the post; and*
*a connector at a distal end of the arm, wherein the connector is orthogonal relative to the axis of the extension such that the single panel is laterally spaced apart from the extension when the single panel is coupled to the arm via the connector.*

*152. A sneeze guard comprising: a first post; a first bracket assembly coupled to the first post such that the first bracket assembly is movable relative to the first post, wherein the first* bracket assembly includes a locking mechanism that is operable to lock the first bracket assembly to the first post at a certain location on the first post; a single panel pivotally coupled to the first bracket assembly by an arm, the single panel comprising a front face, a back face, and four sides, wherein the arm pivots about a pivot point located between a top edge and a bottom edge of the single panel, and wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces; and a second post and a second bracket assembly coupled to the second post, wherein the second bracket assembly is also pivotally coupled to the single panel to permit the single panel to be pivoted relative to the posts; wherein the single panel is the only panel coupled to the first and second bracket assemblies; and wherein the first and second bracket assemblies are coupled to the single panel to provide a substantially unobstructed view of food positioned behind the single panel when viewed through the single panel;

wherein at least one of the first or the second bracket assemblies comprises a housing that is receivable about its respective post, wherein the housing comprises an extension that extends from the housing, wherein an axis of the extension is perpendicular to a longitudinal axis of the respective post and is laterally offset from the single panel such that the single panel is laterally spaced apart from the extension, and wherein the single panel is constructed of a clear material.

153. A sneeze guard comprising: a first post; a first bracket assembly coupled to the first post such that the first bracket assembly is movable relative to the first post, wherein the first bracket assembly includes a locking mechanism that is operable to lock the first bracket assembly to the first post at a certain location on the first post; a single panel pivotally coupled to the first bracket assembly by an arm, the single panel comprising a front face, a back face, and four sides, wherein the arm pivots about a pivot point that is located between a top edge and a bottom edge of the single panel; and wherein the arm includes a coupling arrangement that comprises a pair of opposing attachment members, wherein one of the opposing attachment members is positioned on the front face and the other opposing attachment member is positioned on the back face, and wherein the opposing attachment members are compressed against the front and back faces; and a second post and a second bracket assembly coupled to the second post, wherein the second bracket assembly is also pivotally coupled to the single panel to permit the single panel to be pivoted relative to the posts; wherein the single panel is the only panel coupled to the first and second bracket assemblies; and wherein the first and second bracket assemblies are coupled to the single panel to provide a substantially unobstructed view of food positioned behind the single panel when viewed through the single panel;

wherein at least one of the first or the second bracket assemblies comprises a housing that is receivable about its respective post and an extension that extends from the housing, wherein an axis of the extension is perpendicular to a longitudinal axis of the respective post; and a connector at a distal end of the arm, wherein the connector is orthogonal relative to the axis of the extension such that the single panel is laterally spaced apart from the extension when the single panel is coupled to the arm via the connector, and wherein the single panel is constructed of a clear material.

154. A sneeze guard comprising: at least one post; a bracket assembly coupled to the at least one post such that the bracket assembly is movable relative to the at least one post, wherein the bracket assembly includes a locking mechanism that is movable with the bracket assembly along the at least one post and that is operable to lock the bracket assembly to the at least one post at any location along the at least one post where the bracket assembly is movable on the at least one post; and a panel that is constructed of a clear material coupled to the bracket assembly; wherein the bracket assembly includes a pair of arms, and further comprising a panel coupled to each arm, wherein each panel is constructed of the clear material.

155. A sneeze guard comprising: at least one post having a longitudinal axis defining a length; a bracket assembly coupled to the post such that the bracket assembly is movable lengthwise relative to the longitudinal axis of the post along at least a majority of the length of the post while the bracket assembly remains coupled to the post; an arm pivotally coupled to and extending from the bracket assembly; a locking mechanism that is incorporated with the bracket assembly such that the locking mechanism moves along with the bracket assembly along at least a majority of the length of the post and is operable to lock the bracket assembly to the post at a certain location relative to the post such that the bracket assembly is lockable to the post at any location along the post about which the bracket assembly is movable; and a panel coupled to the bracket assembly by the arm, wherein the panel is movable to different angular locations relative to the post by pivoting the arm; wherein:

the bracket assembly includes a pair of arms, and further comprising a panel coupled to each arm, wherein each panel is constructed of a clear material.

156. A sneeze guard as in claim 1, wherein the single panel is coupled with the arm such that both a top edge and a bottom edge of the single panel are movable from a position in front of the longitudinal axis of the post to a position behind the longitudinal axis of the post when the arm is rotated.

* * * * *